(12) United States Patent
Castro-Pareja et al.

(10) Patent No.: US 7,280,710 B1
(45) Date of Patent: Oct. 9, 2007

(54) ARCHITECTURE FOR REAL-TIME 3D IMAGE REGISTRATION

(75) Inventors: Carlos R. Castro-Pareja, Columbus, OH (US); Raj Shekhar, Sagamore Hills, OH (US); Jogikal M. Jagadeesh, Columbus, OH (US)

(73) Assignee: Cleveland Clinic Foundation, Cleveland, OH (US)

( * ) Notice: Subject to any disclaimer, the term of this patent is extended or adjusted under 35 U.S.C. 154(b) by 666 days.

(21) Appl. No.: 10/443,249

(22) Filed: May 22, 2003

Related U.S. Application Data

(60) Provisional application No. 60/383,171, filed on May 24, 2002.

(51) Int. Cl.
G06K 9/32 (2006.01)
G06K 9/54 (2006.01)
G06K 9/60 (2006.01)
G06K 9/00 (2006.01)

(52) U.S. Cl. .................. 382/303; 382/154; 382/300; 382/304

(58) Field of Classification Search ................ 382/303, 382/304, 154, 300
See application file for complete search history.

(56) References Cited

OTHER PUBLICATIONS

Melis et al.; "Image Registration of Real-time Video Data using the SONIC Reconfigurable Computer Platform", pp. 3-12, 10th Annual IEEE Symposium on Field-Programmable Custom Computing Machines (FCCM'02), Apr. 22-24, 2002.*

Maintz et al.; "A Survey of Medical Image Registration", Medical Image Analysis, vol. 2, No. 1, 1998.*

Collignon et al.; "Automated multi-modality image regitrationbased on informaion theory", Information Processing in Medical Imaging, pp. 263-274, 1995.*

Capek et al.; "Robust and Fast Medical Regsitration of 3D-Multi-Modality Data Sets", proceedings of Medicon 2001—IX Mediterranean Conference on Medical and Biological Engineering and Computing, pp. 515-518, Jun. 2001.*

Hesseret al.; "Three Architectures for Volume Rendering", Computer Graphics Forum, vol. 14, No. 3, 1995.*

Meissner et al.; "Accelerating Volume Rendering Using an On-Chip SRAM Occupancy Map", The 2001 IEEE International Symposium on Circuits and Systems, vol. 2, 2001.*

Pfister et al.; "Architectures for Real-Time Volume Rendering", Future Generation Computer Systems, vol. 15, 1999.*

El-Ghazawi et al.; "Wavelet-Based Image Registration on Parallel Computers", ACM, 1997.*

Warfield et al.; "A High Performance Computing Approach to the Registration of Medical Data", Parallel Computing vol. 24, Issue 9-10, pp. 1345-1368, Sep. 1998.☐☐*

(Continued)

Primary Examiner—Bhavesh M Mehta
Assistant Examiner—John B Strege
(74) Attorney, Agent, or Firm—Eschweiler & Associates, LLC

(57) ABSTRACT

A system architecture is disclosed that facilitates rapid execution of 3D registration or alignment algorithms. A first image module (e.g., RAM) is included to store data corresponding to images to be registered. A processor coupled to the first storage module accesses the data and determined mutual histogram (MH) values which are then used to compute mutual information (MI) between the images. The processor accumulates the MH values in a second image module. The second storage module is accessible so that registered images can be displayed. The architecture is scalable facilitating distributed calculations to speed-up the registration process.

15 Claims, 21 Drawing Sheets

OTHER PUBLICATIONS

"An Architecture for Real-Time 3D Image Registration", Carlos Raul Castro Pareja, M.S. Thesis, Dept. Electric Eng., The Ohio State University, Columbus, Ohio, 2002, 96 pgs.

"A Memory Addressing and Access Design for Real Time Volume Rendering", Michael Doggett and Michael Meissner, Proceedings of the 1999 IEEE International Symposium on Circuits and Systems, ISCAS 1999, vol. 4, pp. 344-347.

"Multimodality Image Registration by Mazimization of Mutual Information", Frederik Maes, Andre Collignon, Dirk Vandermeulen, Guy Marchal and Paul Suetens, IEEE Transactions on Medical Imaging, vol. 16, No. 2, Apr. 1997, 12 pages.

Nonrigid Image Registration in Shared-Memory Multiprocessor Environments With Application to Brains, Breasts, and Bees:, Torsten Rohlfing and Calvin R. Maurer, Jr., IEEE Trans. on Information Technology in Biomedicine, vol. 7, No. 1, Mar. 2003, pp. 16-25.

"Alignment by Maximization of Mutual Information", Paul Viola and William M. Wells III, Proceedings of the Fifth International Conference on Computer Vision, IEEE 1995, pp. 16-23.

"Multi-Modal Volume Registration by Maximization of Mutual Information", William M. Wells III, Paul Viola, Hideki Atsumi, Shin Nakajima and Ron Kikinis, Medical Image Analysis (1996) vol. 1, No. 1, pp. 35-51.

* cited by examiner

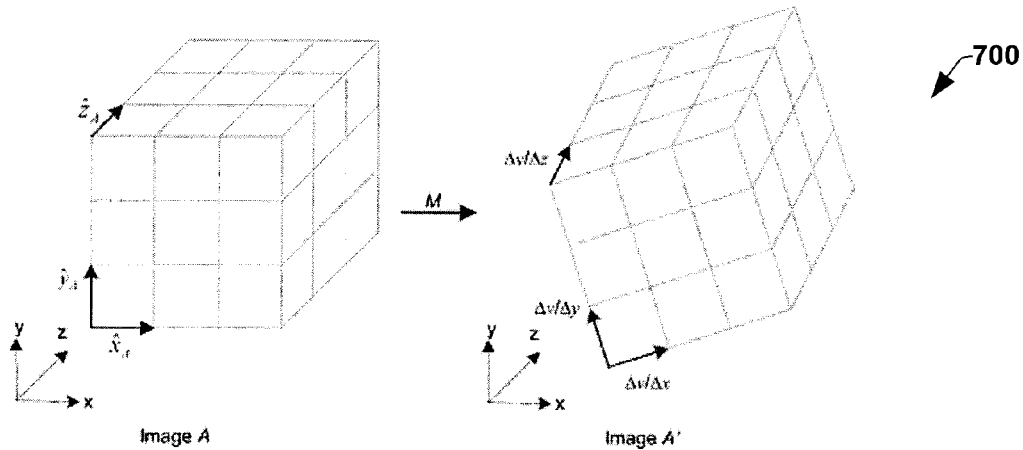

Fig. 7

| VARIABLE | DESCRIPTION |
|---|---|
| $v_x, v_y, v_z$ | Vectors used to store the Image A' coordinates of the current voxel, the first voxel of the current row and the first voxel of the current plane, respectively. |
| $x, y, z$ | Image A coordinates of the current voxel |
| $v_B$ | Integer part of $v_x$, which corresponds to the origin of the Image B voxel neighborhood assigned to the current Image A voxel. |
| $v_{frac}$ | Fractional part of $v_x$, which is used to calculate the interpolation weights. |
| $W$ | Vector that contains the eight interpolation weights. |
| $i, j, k$ | Indices used to generate the Image B coordinates of each voxel in the neighborhood |
| $Int\_Index$ | W vector index used to relate each weight to its corresponding Image B voxel. |
| $MH$ | Mutual Histogram matrix (256x256) |

Fig. 8

| RAM TYPE | MAX. SIZE (BITS) | ACCESS TIME (NS) @100MHZ | COMMENTS |
|---|---|---|---|
| Asynchronous Fast SRAM | 4M | 10 | Expensive, relatively small sizes, simple control. |
| Synchronous Fast SRAM | 32M | 10 | Expensive at big sizes, simple control, mostly available at small sizes |
| Asynchronous Low Power SRAM | 8M | 60 | Medium cost, small sizes, simple control. |
| SDRAM | 512M | 80 | Cheap at big sizes, complex control, need refresh cycles. |

Fig. 19

| DEVICE | MAX CLOCK SPEED (MHZ) | LEVEL OF PARALLELISM | LEVEL OF PIPELINING | COMMENTS |
|---|---|---|---|---|
| Microprocessor | ~1500 | Instruction | Instruction | Can perform only one external memory operation at a time. Limited amount of ALUs and FPUs. Instruction set not optimized for calculation-intensive applications. |
| DSP | ~600 | Instruction | Instruction | Can perform only one external memory operation at a time. Bigger amount of ALUs and FPUs than equivalent microprocessors. Instruction set optimized for calculation-intensive applications |
| FPGA | 250 | Register Transfer | Flexible | Algorithm has to be implemented using HDLs. Implementation subject to limited amount of internal resources. Can perform multiple external memory accesses in parallel, through different memory busses. |

Fig. 20

| OUTPUT REGISTER | OUTPUT | CONDITIONS |
|---|---|---|
| A_Out | A | Im_A ≠ {Im_B, Im_C, Im_D} |
| | A + B | Im_A ≠ {Im_C, Im_D}, Im_A = Im_B |
| | A + C | Im_A ≠ {Im_B, Im_D}, Im_A = Im_C |
| | A + D | Im_A ≠ {Im_B, Im_C}, Im_A = Im_D |
| | A + B + C | Im_A ≠ Im_D, Im_A = {Im_B, Im_C} |
| | A + B + D | Im_A ≠ Im_C, Im_A = {Im_B, Im_D} |
| | A + C + D | Im_A ≠ Im_B, Im_A = {Im_C, Im_D} |
| | A + B + C + D = 1 | Im_A = {Im_B, Im_C, Im_D} |
| B_Out | B | Im_B ≠ {Im_A, Im_C, Im_D} |
| | B + C | Im_B ≠ {Im_A, Im_D}, Im_B = Im_C |
| | B + D | Im_B ≠ {Im_A, Im_C}, Im_B = Im_D |
| | B + C + D | Im_B ≠ Im_A, Im_B = {Im_C, Im_D} |
| | C | Im_B = Im_A, Im_C ≠ Im_D |
| | C + D | Im_B = Im_A, Im_C = Im_D |
| | D | Im_A = {Im_B, Im_C} |
| C_Out | C | No Image B values are equal |
| | C + D | Im_C = Im_D |
| | D | Im_C = Im_A, or Im_C = Im_B or Im_A = Im_B |
| D_Out | D | Always |

Fig. 25

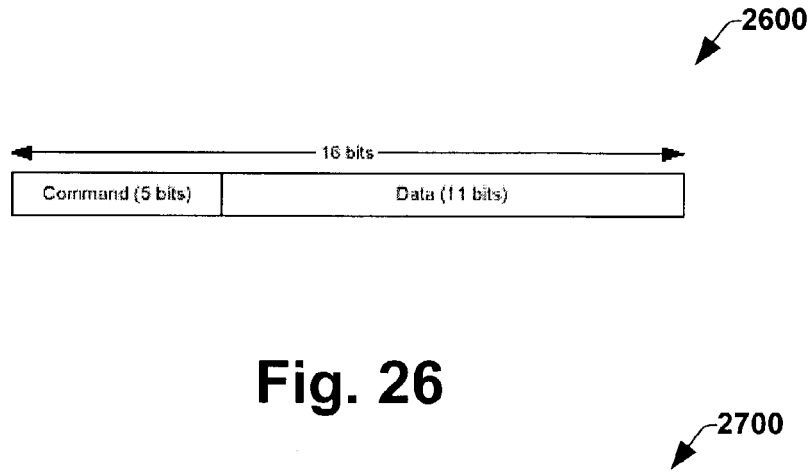

Fig. 26

| INSTRUCTION NUMBER | NEEDS DATA | NEEDS VALID ID | DESCRIPTION |
|---|---|---|---|
| 0 | No | No | No Operation |
| 1 | Yes | No | Set ID: Defines the board to be accessed |
| 2 | Yes | No | Load B: Loads a new value into the Image B RAM |
| 3 | No | No | Reset A: Starts the loading of Image A |
| 4 | No | No | Reset B: Starts the loading of Image B |
| 5 | No | No | Reset MH: Clears the MH RAM |
| 6 | No | No | Start: Starts the MH calculation process |
| 7 | No | No | Load MH: Puts the next MH value into the outputs |
| 8 | Yes | Yes | Load the integer part of the origin's X-coordinate |
| 9 | Yes | Yes | Load the fractional part of the origin's X-coordinate |
| 10 | Yes | Yes | Load the integer part of the origin's Y-coordinate |
| 11 | Yes | Yes | Load the fractional part of the origin's Y-coordinate |
| 12 | Yes | Yes | Load the integer part of the origin's Z-coordinate |
| 13 | Yes | Yes | Load the fractional part of the origin's Z-coordinate |
| 14 | Yes | Yes | Load A: Loads a new value into the Image A RAM |
| 16 | Yes | No | Load X component of the X increment vector |
| 17 | Yes | No | Load Y component of the X increment vector |
| 18 | Yes | No | Load Z component of the X increment vector |
| 19 | Yes | No | Load X component of the Y increment vector |
| 20 | Yes | No | Load Y component of the Y increment vector |
| 21 | Yes | No | Load Z component of the Y increment vector |
| 22 | Yes | No | Load X component of the Z increment vector |
| 23 | Yes | No | Load Y component of the Z increment vector |
| 24 | Yes | No | Load Z component of the Z increment vector |
| 25 | Yes | No | Load X size of Image A |
| 26 | Yes | No | Load X size of Image B |
| 27 | Yes | No | Load Y size of Image B |
| 28 | Yes | No | Load Z size of Image B |

Fig. 27

| DEVICE | TYPE | NUMBER | USED FOR |
|---|---|---|---|
| EP1K100FC484-1 | FPGA | 2 | Address Generator<br>Address Decoder<br>Image B Controller<br>Interpolator<br>Compactor<br>Accumulator<br>MH Controller |
| EP1K50QC208-3 | FPGA | 1 | Image A Controller<br>PC Interface |
| K4S561632B-TC1H000 | SDRAM 16Mx16 | 1 | Image A RAM |
| K4S641632D-TC10000 | SDRAM 4Mx16 | 4 | Image B RAM |
| CY7C1329-100AC | SRAM 64Kx32 | 2 | MH RAM |

| IMAGE SIZE | MI CALCULATION TIME (MS) | |
|---|---|---|
| | Software | Hardware |
| 64x64x64 | 430 | 36 |
| 128x128x128 | 3500 | 240 |
| 256x256x256 | 28000 | 1861 |

ARCHITECTURE FOR REAL-TIME 3D IMAGE REGISTRATION

RELATED APPLICATIONS

This application claims benefit of provisional application Ser. No. 60/383,171, filed May 24, 2002, the entirety of which is incorporated herein by reference.

TECHNICAL FIELD

The present invention relates to image processing, and more particularly to a system architecture that facilitates fast 3D image registration.

BACKGROUND OF THE INVENTION

Image registration is the process of aligning two or more images that represent the same object at different times, where the images may be taken from different viewpoints and/or with different sensors. Image registration is used in the medical imaging field to merge or compare the results of the same (monomodal) or different (multimodal) imaging modalities, such as magnetic resonance imaging (MRI), positron emission tomography (PET), single photon emission computed tomography (SPECT), ultrasound (US) and computed tomography (CT). Common examples of image registration applications in the medical field are multi-modality registration of anatomical (e.g., CT, MRI) and functional (e.g., PET, SPECT) images for accurate localization of tumors as well as delineation of their respective shapes and sizes, as well as the registration of serial images taken at different points in time to monitor the progression or regression of a disease, or to do post-operative follow-up. Another example of image registration is brain atlas registration, in which a brain image is warped or compared to a predefined template to identify and label specific regions of the brain. In general, registration of images acquired using the same modality allows monitoring changes over time, while registration of images acquired using different modalities increases the structural and functional information about a certain organ or region of the body.

Automatic three dimensional (3D) image registration is a numerically intensive task and usually demands large execution times (e.g., on the order of minutes). Total execution time can easily exceed an hour, for example, when registering 3D cardiac image sequences (e.g., of 20-30 images).

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its primary purpose is to present some concepts of the invention in a simplified form as a prelude to the more detailed description that is presented later.

The present invention relates to a system architecture that facilitates fast execution of algorithms that maximize mutual information (MI) between two images to align or register the images, where MI calculations are based upon Mutual Histograms (MH) between the images. Such calculations generally comprise tasks that are memory-intensive. The system architecture includes MH calculating modules that can operate independently or in parallel to perform MH calculations, thus facilitating distributing MI calculations and scalability. Respective modules support independent memory busses and an MH calculation pipeline, which effectively speeds up MH calculation time.

According to one or more aspects of the present invention, the system architecture facilitates rapid execution of 3D registration or alignment algorithms. The system includes an interface that stores image data inside an image RAM and configures a processor. The processor accesses the image RAM, which comprises two independent memory busses which allow parallel and simultaneous access to both images and utilizes mutual histogram (MH) RAM as an accumulator to obtain MH values. The interface reads the MH values from the MH RAM. Parallel modules (e.g., processors and/or RAM) can be implemented to speed up processing.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 7 illustrates the relationship between coordinates in two images, Image A and Image A'.

FIG. 8 illustrates a table describing variables used in an exemplary pseudocode.

FIG. 19 illustrates a table comparing different RAM architectures.

FIG. 20 illustrates a table comparing processor implementations.

FIG. 25 illustrates a table depicting exemplary relationships between compactor inputs and outputs as may be comprised within a decision-making algorithm in accordance with one or more aspects of the present invention.

FIG. 26 illustrates an instruction word format.

FIG. 27 illustrates a table depicting a list of valid command instructions.

DETAILED DESCRIPTION OF THE INVENTION

Figure 1:
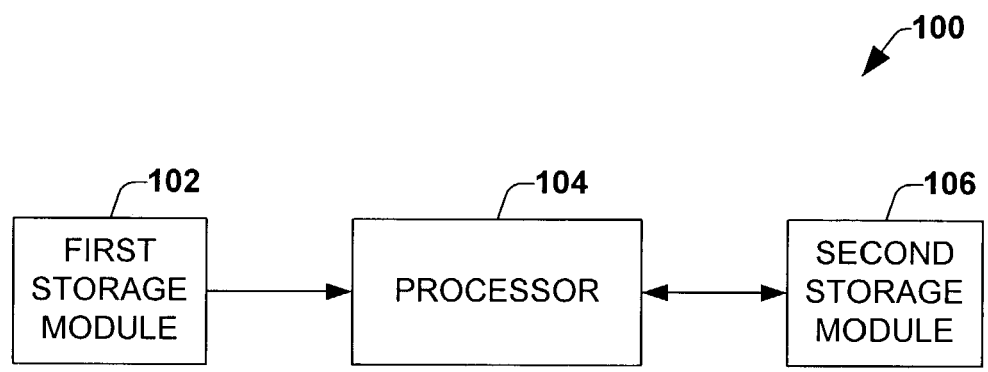
FIG. 1 is a schematic block diagram illustrating an exemplary three dimensional (3D) image registration system according to one or more aspects of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

The description is at times represented herein in terms of processes and symbolic representations of operations by conventional computer components (e.g., central processing unit (CPU) or processor associated with a general purpose computer system, memory storage devices for the CPU, connected pixel-oriented display devices). These symbolic representations are a means used by those skilled in the art of computer programming and computer construction to convey teachings and discoveries to others skilled in the art. For the purposes of this discussion, a process or method is generally considered to be a sequence of computer-executed steps leading to a desired result. These steps usually require manipulations of physical measurable quantities (e.g., electrical, magnetic, optical signals capable of being stored, transferred, combined, compared). Those skilled in the art use various terms to refer to these quantities (e.g., as bits, values, elements, symbols, characters, text, terms, numbers, records, files). It should be understood that manipulations within the computer are often referred to with various terms (e.g., adding, comparing, moving) that are often associated with manual operations performed by a human operator. The operations described herein may be performed in conjunction with a human operator or user that interacts with the computer or computers. It is to be appreciated, however, that in accordance with various aspects of the present invention involvement of a human operator may not be necessary or even desirable.

It should be understood that the examples described herein are not limited to any particular computer, program, apparatus or language type (e.g., assembly, machine, compiled, interpreted). Additionally, the software and hardware configurations set forth herein are not limited to any specific hardware or software configuration. Rather, the systems and methodologies described herein can be implemented on a wide variety of hardware and software platforms (e.g., specialized apparatus to perform the systems and methods described herein, dedicated computer systems with hardwired logic or programs stored in memory, discrete logic devices, large scale integrated circuits (LSIs), application-specific integrated circuits (ASICs), combinations of computer components with other non-computer components, reduced capacity computers). It is also to be understood that the examples provided herein may be implemented in various environments (e.g., networked architectures utilizing clients and servers, public and private computer networks, computer networks of commercial on-line services, internal corporate local area networks (LANs), or intranets).

It is also to be appreciated that one or more aspects of the present invention can have application across different topologies or zones as the network may comprise numerous configurations (e.g., Internet, intranets, wide area networks (WANs), LANs, SNA networks, extranets) supported by any of a variety of connection types or mediums (e.g., telephone line and modem, integrated services digital network (ISDN), T1, T2, T3, T4, DS1 or other high speed telecommunications connections and appropriate connection device, television cable and modem, satellite link, optical fiber link, Ethernet or other local area network technology wire and adapter card, wireless link, radio or optical transmission devices).

It is to be further appreciated that data storage implementations described herein may be comprised of any types of structures having any arrangements or configurations facilitating desired retrieval, storage and/or searching not departing from the spirit and scope of the present invention (e.g., combination or individual implementation of two dimensional arrays, three dimensional arrays, relational databases, object-oriented databases, object-relational databases, data tables, other searchable structures).

It is also to be understood and appreciated that one or more methodologies may be implemented in accordance with one or more aspects of the present invention and may be better appreciated with reference to some examples illustrated in some of the Figs. While, for purposes of simplicity of explanation, some Figs. depict a series of blocks arranged serially, it is to be understood and appreciated that the present invention is not limited by the order of the blocks as some may, in accordance with various aspects of the present invention, occur in different orders and/or concurrently as described herein. Moreover, not all illustrated features may be required to implement a methodology in accordance with an aspect of the present invention. It is further to be appreciated that methodologies may be implemented as computer-executable instructions (e.g., software stored in a computer-readable medium). Alternatively, the methodology may be implemented as hardware or a combination of hardware and software.

FIG. 1 is a schematic block diagram illustrating a three dimensional (3D) image registration or alignment system 100 according to one or more aspects of the present invention. The system architecture facilitates rapid execution of 3D registration or alignment algorithms by implementing parallel memory access and pipelining. The 3D image registration architecture disclosed mitigates bottlenecks related to mutual information (MI) and mutual histogram (MH) calculations performed on computers and facilitates real-time speed. The diagram depicts the basic system blocks and the flow of data through them. A first storage module (e.g., RAM) 102 is included to store data corresponding to images to be registered. It is to be appreciated that while a single module 102 is shown, multiple modules can be utilized to store multiple images. Two images can, for example, be stored in independent memory blocks, which can be accessed in parallel. One of the image memory blocks can be accessed serially, for example, while the other one implements cubic addressing (discussed later) in order to enhance the access to 3D voxel neighborhoods, where a voxel can be thought of as a 3D pixel or volumetric element. A processor 104 coupled to the first storage module 102 accesses the data and determines values to be accumulated into a MH. The processor 104 accumulates the MH values in a second storage module 106. The processor can also access the second storage module 106 to update MH values. The second storage module 106 is accessible (e.g., readable by an interface, not shown) to allow retrieval of the MH values. It will be appreciated that, like the first storage module 102, the processor 104 and/or the second storage 106 may also comprise multiple modules (e.g., arranged in parallel), such that the architecture is scalable to facilitate distributed calculations and expedited calculation times.

It will be appreciated that, in accordance with one or more aspects of the present invention, the system can be utilized to compare serial 3D images (e.g., taken at different points of time) to assess disease progression or regression within bodily organs, for example. The system facilitates superimposing or fusing multi-modality images where, for example, one image shows anatomic structures and another relates to blood perfusion or cellular metabolism. The system can align images irrespective of their modality, sample size, spatial sampling rate, etc. such that they can subsequently be added or subtracted. Application can be made to nondeformable organs (with a fixed shape and size) such as the brain as well as to deformable organs such as the heart, and real-time aspects can have application to, among other things, image-guided surgery, for example.

Image registration can likewise be applied to images acquired from the same imaging modality (monomodal image registration) or obtained from different modalities (multimodal image registration). Multimodal image registration may pose issues as corresponding features in multiple images can have different gray levels and object boundaries, and correspondence between voxel values can be nonlinear. One example is registration of brain images acquired using positron emission tomography (PET) and computed tomography (CT) or magnetic resonance imaging (MRI). PET images provide information about tissue physiology, which is useful for detecting tumors and other anomalies in the brain, while CT and MRI images give information about its morphological structure, which helps to obtain coordinates of the features recognized in the PET image inside of the skull. Nevertheless, one or more aspects of the present invention facilitate alignment or registration of such differently acquired images.

MI based image registration relies on maximization of MI between two images. The MI is a function of the two images and a transformation between them. A 4×4 transformation matrix generally contains information about rotation, translation, scaling and shear to facilitate the registration. An optimization algorithm is utilized to find the transformation matrix that maximizes MI between two given images.

A transformation that aligns two images can be classified as rigid-body, affine, projective or curved. Rigid-body and affine transformations are frequently utilized to match medical images. Both transformations can be described by the following formula:

$$\begin{bmatrix} x_1 \\ y_1 \\ z_1 \end{bmatrix} = A \begin{bmatrix} x \\ y \\ z \end{bmatrix} + T$$

where x, y and z are original coordinates of a voxel, and $x_1$, $y_1$ and $z_1$ are the coordinates after the transformation. The matrix A is a rotation matrix in the rigid-body case and a general 3×3 matrix (e.g., containing rotation, scaling and shear) in the affine case, and T is a translation matrix. An affine transformation is composed of translation, rotation, scaling and shear, while a rigid-body transformation is essentially a case of the affine transformation involving rotation and translation. The nature of the transformation determines the dimensionality of the optimization algorithm. A translation-only transformation generally requires a 3D optimization algorithm, for example, while a rigid-body transformation and a full affine transformation require search in 6 and 12 dimensions, respectively. As the dimensionality of the search space grows, it will generally require more iterations to converge.

Image matching transformation approaches can be classified into multiple groups: point/landmark-based, segmentation-based and voxel-similarity based, for example. Landmark based metrics can be obtained by setting several landmark points, which can be some internal recognizable features in the image or some objects of reference that have been attached to or inserted into the body. The comparison of the position of the landmark points in the two images gives a measure of the transformation needed to align them. However, user interaction is necessary with these techniques to identify landmarks in the images and, in invasive cases, the attachment of a reference point to the body. Manual landmark identification can not facilitate fully automated image registration and can limit the accuracy of the registration process to the accuracy of landmark identification.

Additionally, for multimodal image registration, a landmark has to be found that is recognizable across different imaging modalities.

Segmentation-based metrics require the segmentation of a particular shape inside of respective images to be registered in order to calculate the transformation that aligns or registers the shape from the two images. The accuracy of registration depends upon the accuracy of segmentation, which is why such techniques are generally utilized in low-noise imaging modalities (e.g., MRI, CT).

Figure 2:
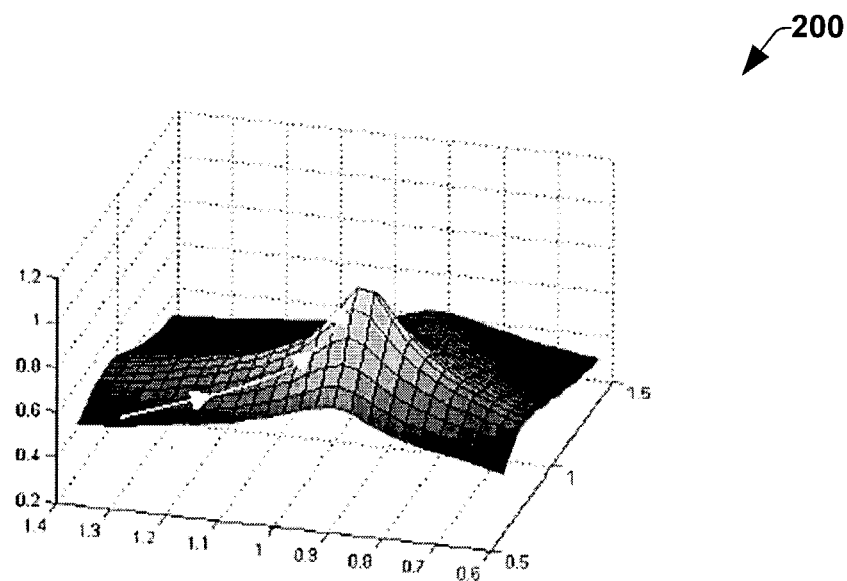
FIG. 2 illustrates an example of a voxel similarity surface (VSS) depicting a path that an optimization algorithm may traverse in trying to find a maximum according to one or more aspects of the present invention.

Voxel similarity-based metrics generally include two parts: a voxel similarity metric and an optimization algorithm. The voxel similarity metric gives a quantitative evaluation of the degree of similarity between two images based on their voxel values. It can be calculated by comparing the individual voxel values or by statistically finding a relationship between voxel values in both images. This metric is used by the optimization algorithm to find the transformation that best aligns two images. FIG. 2 is a graphical depiction 200 illustrating an example of a voxel similarity surface (VSS) showing a path that an optimization algorithm may traverse in trying to find a maximum. This surface is obtained by calculating the values of the voxel similarity metric (e.g., z-axis) for different transformation parameters (e.g., x and y-axis). The VSS has the dimensionality of the registration space, which means that the number of dimensions of the VSS equals the number of parameters being searched by the registration process. The optimization algorithm finds the maximum of the VSS with a few voxel similarity calculations by finding a voxel similarity metric leading to a VSS with few local extrema and a smooth gradient.

Cross-correlation in both space and frequency domains may be utilized as a voxel similarity metric. To offset high computational cost associated with performing cross-correlation of two full 3D images, space-domain correlation can be performed between a whole image and a small portion of the other image. Correlation can, for example, be performed after applying ridgeness operators to the original images. The correlation of ridges and troughs facilitates registration of images from different modalities. Comparisons can be made of space-domain, frequency-domain and phase correlation techniques. Correlation is an effective voxel similarity measure for images with low noise, but its calculation requirements can be substantial for real-time applications, especially when applied to noisy images such as ultrasound images.

Sign change criterion (SCC) voxel similarity metrics essentially include subtracting two images and counting the number of sign changes in the resulting image. If both images are aligned, the result of the subtraction is merely a function of acquisition noise. If the noise distribution is centered around zero, the images are better matched when the sign changes are maximal. This criterion can be utilized for monomodal image registration and is robust for images with small difference in contents.

Coincidence bit counting (CBC) voxel similarity metrics is similar to the SCC, but instead of subtracting images it does a bit-compare (XNOR) operation between the images and then counts the number of matching most significant bits. Like the SCC, this criterion relies heavily on individual gray scale values, making it useful for monomodal image registration.

Mutual information (MI) voxel similarity metrics measure the statistical interdependence between the voxel values of two images. MI based registration attempts to find the transformation T that best aligns a reference image u and a floating image v:

$$T = \arg \max_T MI(u(x,y,z), v(T(x,y,z)))$$

MI is calculated from individual and joint entropies using the following equations:

$$MI(u,v) = h(u) + h(v) - h(u,v),$$

The individual entropies, h(u) and h(v), and the joint entropy, h(u,v), are computed as follows:

$$h(u) = -\Sigma p(x) \ln p(x)$$

$$h(v) = -\Sigma p(y) \ln p(y)$$

$$h(u,v) = -\Sigma p(x,y) \ln p(x,y)$$

where p(x) is the probability of a gray level x being present in the volume u, and p(x,y) is the probability of a voxel in image u having the gray level x and the corresponding voxel in image v having the gray level y. The MI criterion is useful for multimodal image registration because it can accommodate nonlinear information relations between data sets. The joint probability p(x,y) of a voxel in image u having a value x given that the corresponding voxel in image v has a value y can be obtained from the joint or mutual histogram (MH) of the two images. The MH is a representative of the joint intensity probability distribution. The goal of the registration algorithm is to minimize the dispersion of values inside the MH, which also minimizes the joint entropy and maximizes the MI.

Generalized mutual information (GMI) voxel similarity metrics utilize second-order entropies in lieu of the first-order ones used in MI:

$$GMI(u,v) = h^{(2)}(u) + h^2(v) - h^{(2)}(u,v)$$

where:

$$h^{(2)}(u) = -\Sigma p^2(x)$$

$$h^{(2)}(u,v) = -\Sigma p^2(x,y)$$

GMI can be robust as compared to MI, but can be computationally intensive. And, GMI registration surfaces can be less smooth and have more local extrema than those produced by MI.

Optimization algorithms are used with voxel-similarity approaches to find the transformation parameters that maximize voxel similarity. In general, for an optimization algorithm to be utilized with image registration algorithms, the optimization algorithm should be a nonlinear, multidimensional optimization algorithm. This is because of the nature of the voxel similarity function to be maximized. This function can depend on up to 12 parameters and its value may not be a linear function of them. The optimization algorithm should also have a low number of function evaluations.

In the case of image registration, for example, the function to be maximized is the voxel similarity function. Since calculation of voxel similarity can come at a high computational cost, it is desirable that the optimization algorithm requires a low or the least possible number of function evaluations to converge. The optimization algorithm should also have the ability to recover from convergence on a local extremum. In particular, the algorithm should have a way to avoid convergence on local extrema of the voxel similarity function. The optimization algorithm should also have limited gradient calculation requirements. Since it is difficult to calculate the gradient of the voxel similarity function analytically, the calculation is made numerically (using, for example, the finite-difference method), which has a high calculation cost. This renders first and second-order algorithms (e.g., those which need first and second-order gradient calculations) inappropriate from the list of available algorithms. A constrained optimization algorithm may be utilized, since the parameters to be optimized usually fall within a known range.

One multidimensional algorithm for image recognition is the univariate method. The univariate method is an unconstrained nonlinear optimization algorithm. It is implemented as a series of one-dimensional searches. It uses a one-dimensional optimization algorithm (e.g., Brent's method) to find an optimum value for the first variable, while keeping the others constant. Then it moves on to the second variable and so on until all variables have been optimized. At this point, the algorithm repeats itself until no variable changes. This is a simple search method that can be applied to find the minimum of a function having continuous derivatives. However, the algorithm may not converge for functions that have a steep valley in the VSS.

The downhill simplex method is another multidimensional algorithm for image recognition. The simplex method is an unconstrained nonlinear optimization technique. A simplex is a geometric figure formed by n+1 points in an n-dimensional space. For example, a triangle would be a simplex in a 2-D space and a tetrahedron would be a simplex in a 3-D space. The simplex method starts by placing a regular simplex in the solution space and then moves its vertices gradually towards the optimum point through an iterative process.

Another multidimensional algorithm for image recognition is pattern searching. Pattern search methods go a step beyond univariate search methods in that they move in directions not necessarily parallel to the coordinate axes. This mitigates the convergence problem of univariate search methods and reduces the number of iterations needed for convergence. A pattern search method implementing a quadratic convergence property, facilitates convergence of the algorithm when applied to a quadratic function. This property is useful in nonlinear optimization cases because most functions can be approximated by a quadratic function near their extremum. This method can be faster than a downhill simplex method in terms of the number of function evaluations, thus making it suitable for use in image registration and maximizing MI.

Yet another multidimensional algorithm for image recognition is simulated annealing, wherein algorithms are minimization methods based on the way crystals form when a liquid is frozen by slowly reducing its temperature. These algorithms work in a different way than other optimization algorithms in that they do not necessarily follow function gradients, but move randomly, depending on the temperature parameter. While the temperature is high, the algorithm will accept high changes along most any direction(s) (e.g., up, down). As the temperature decreases, the algorithm limits its movements to lower energy levels until a global minimum is achieved. A comparison can be performed on the use of simulated annealing, pattern searching and downhill simplex methods in image registration. In general, simulated annealing can be more robust than the other methods at the expense of a larger number of iterations in the presence of a large number of local minima.

Most image processing hardware can be said to fall into one of the following applications: computer vision, image compression, volume rendering and texture mapping. With regard to volume rendering, to visualize a 3D dataset in real time, the dataset is converted to the 2D image to be displayed. Voxels in the 3D dataset are assigned an opacity value that ranges between 0 (totally transparent) and 1 (totally opaque). Ray casting can, for example, be utilized to calculate the 2D image pixel values. Ray casting is performed by sending one ray for every pixel on the 2D image through the volume and obtaining voxel color and opacity values at a predetermined number of evenly spaced locations inside the volume through trilinear interpolation. The 2D image is obtained by merging the interpolated colors and opacities along each ray in a back-to-front or front-to-back order. The use of ray casting implies random accesses to image memory, whereas the use of trilinear interpolation requires accessing eight voxel neighborhoods at a time.

MI based registration usually requires hundreds of iterations (e.g., MI evaluations), depending upon the optimization algorithm utilized to maximize the IM function, the image complexity and the degree of initial misalignment. If real-time performance is required, MI calculation times should be on the order of tens of milliseconds. Obtaining the MH for the MI calculation generally involves performing n interpolations, where n is the number of voxels in an image. Calculating the MH typically comprises the vast majority of MI calculation time. Given the speed of conventional microprocessors, 3D MI calculation times are heavily dependent upon memory access times.

With current processors reaching billions of operations per second (GFLOPS), memory throughput can be a bottleneck when dealing with large datasets. One technique for accommodating memory throughput requirements is custom data arrangement in memory, wherein images can be stored in memory in such a way that voxel neighborhoods can be loaded using sequential accesses to the memory, thus benefiting from the higher speeds available using burst-mode RAMs. Additionally, faster RAM can be utilized. In general, Static RAMs (SRAMs) have lower access time than dynamic RAMs (DRAMs), especially for random access. However, 3-D datasets are usually greater in size than most of the largest commercially available SRAMs, making the use of DRAMs a virtual necessity to store such datasets. Synchronous DRAMs (SDRAMs) can be utilized to store the datasets along with an SRAM-based cache system to allow for fast random accesses. SDRAMs facilitate high-speed burst-mode accesses, which allow them to transfer significant amounts of contiguous data at high rates. Alternatively, on-chip RAM with custom designed VLSI chips can be utilized to increase the speed of accesses. Additionally, parallel RAM access can be utilized to increase throughput by broadening the data bus, thus allowing for more than one access at a time. This can be implemented with custom data arrangements to allow for the parallel access of whole voxel neighborhoods. This may, however, increase the number of memory chips necessary for parallel accesses, which can increase design complexity and implementation cost.

One hardware architecture for 3-D volume rendering is skewed memory, wherein parallel data access to a beam of voxels along x, y or z directions is provided to facilitate fast slice-parallel ray tracing. This is performed by distributing the values along n memory modules for an n×n×n voxel dataset using a skewing function $\sigma:[x,y,z] \rightarrow [k,i]$ which maps a voxel with coordinates x, y and z into the memory module number k at index i according to the following formula:

$$k = (x + y + z) \bmod n \quad 0 \leq k, x, y, z < n$$
$$i = y + zn \quad 0 \leq i < n^2$$

Figure 3:
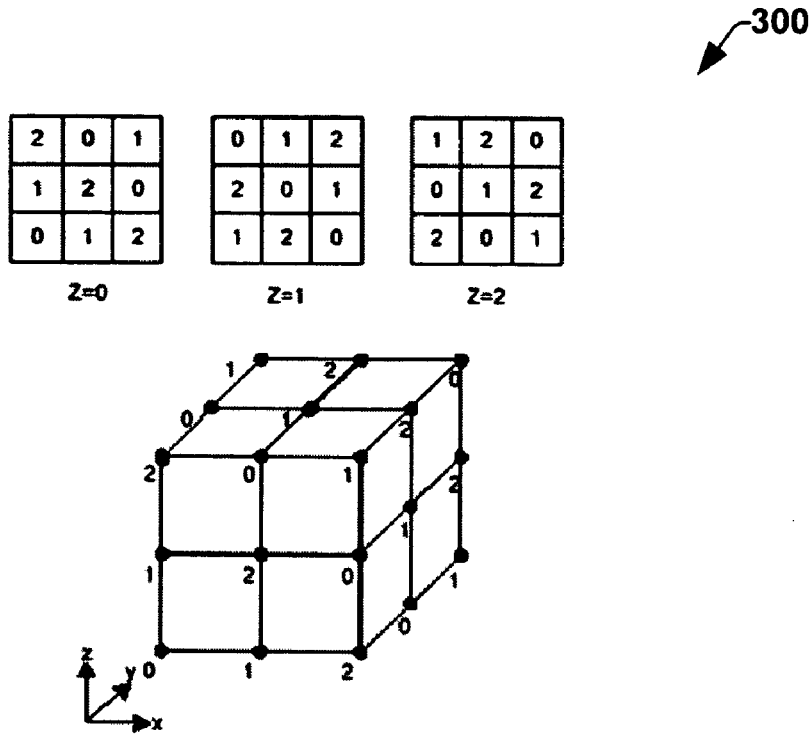
FIG. 3 illustrates an example of skewed memory addressing for n=3.

FIG. 3 is a graphical depiction 300 illustrating an example of skewed memory addressing for n=3. At the top of FIG. 3, k assignments per plane are illustrated for a memory block. A 3D view depicting memory block assignments of visible voxels is illustrated in the bottom of FIG. 3. Data is arranged along the three RAM modules to allow simultaneous, parallel access of all the voxels on any ray in the x, y or z direction. This can be utilized for ray casting hardware, but may not provide parallel access to voxel neighborhoods while requiring a large amount of memory modules, which may make this skewed memory addressing less suitable for an image registration system.

Another hardware architecture for 3-D volume rendering is blocked skewed memory, wherein the amount of memory modules necessary for an efficient skewed memory implementation is reduced by skewing the memory at a block level, instead of a voxel level. This benefits from page-mode accesses to SDRAMs, which allow fast access of contiguous memory blocks. Block skewed memory reduces the number of required memory modules by a factor equal to the burst size of the SDRAM being used. Access to the neighborhood of voxels that are on the boundaries of a block, however, may be limited. In these cases, two block accesses may be performed to retrieve the whole neighborhood.

Figure 4:
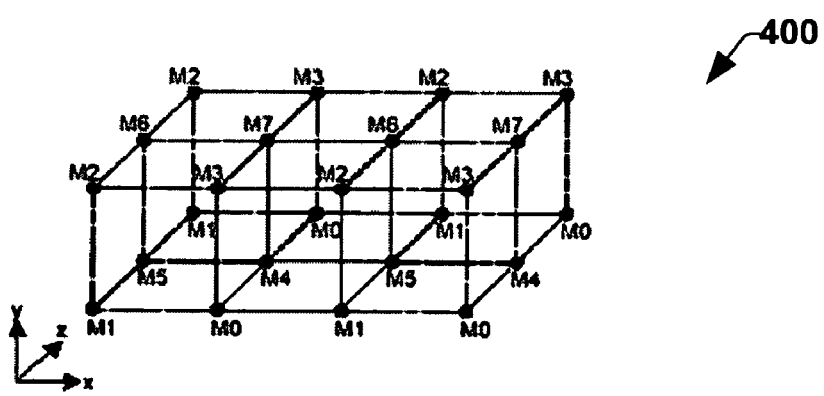
FIG. 4 illustrates the data arrangement of memory module assignments in a cubic addressing scheme.

Yet another hardware architecture for 3-D volume rendering is cubic addressing, which may be utilized for volume rendering applications. It allows parallel access of a 2×2×2 voxel neighborhood by distributing the dataset among eight memory modules. This facilitates the access of voxel neighborhoods in one memory access time. A graphical depiction 400 of the data arrangement of memory module assignments in a cubic addressing scheme is illustrated in FIG. 4. The memory addresses in each module for a neighborhood that starts in vertex ($V_x$, $V_y$, $V_z$) are calculated using the following formulas:

$$M_x = \frac{V_x}{2} + V_x \bmod 2$$

$$M_y = \frac{V_y}{2} + V_y \bmod 2$$

$$M_z = \frac{V_z}{2} + V_z \bmod 2$$

$$U_x = \frac{V_x}{2} \quad U_y = \frac{V_y}{2} \quad U_z = \frac{V_z}{2}$$

M0: ($M_x$, $M_y$, $M_z$)    M1: ($U_x$, $M_y$, $M_z$)

M2: ($U_x$, $U_y$, $M_z$)    M3: ($M_x$, $U_y$, $M_z$)

M4: ($M_x$, $M_y$, $U_z$)    M5: ($U_x$, $M_y$, $U_z$)

M6: ($U_x$, $U_y$, $U_z$)    M7: ($M_x$, $U_y$, $U_z$)

Eight memory modules are utilized in cubic addressing to provide parallel access to a 2×2×2 neighborhood, whereas, in the skewed memory scheme, n modules for an n×n×n voxel dataset are utilized.

Figure 5:
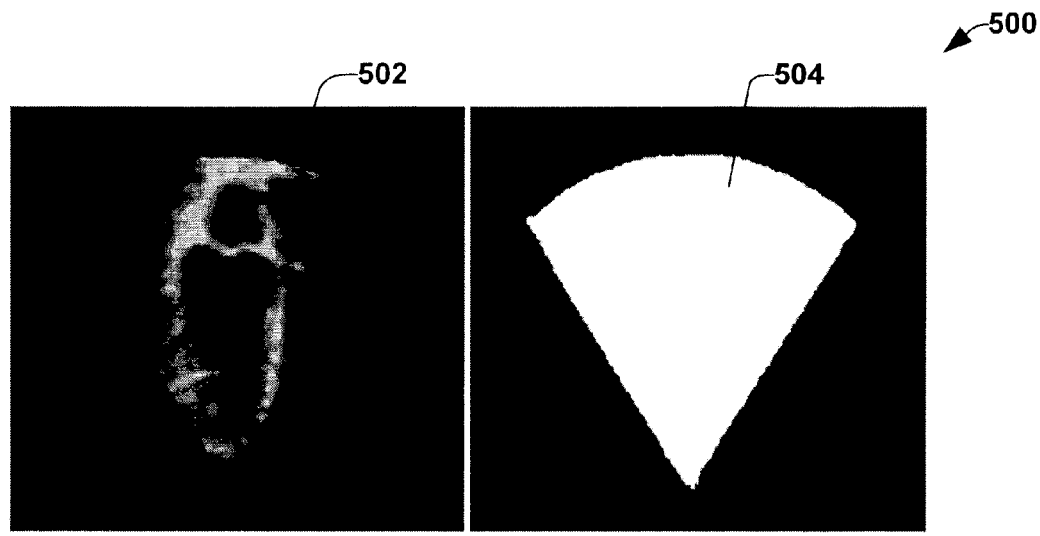
FIG. 5 illustrates an example of a plane of a 3D ultrasound image and its mask.

According to one or more aspects of the present invention, an algorithm suitable for execution on a 3D image registration architecture as described herein can support 9-bit (e.g., 8-bit plus mask) 3D images of up to 256×256×256 voxels. The mask indicates which voxels are inside the image's volume of interest. This allows the algorithm to ignore voxels that do not correspond to the objects being registered. This also facilitates support of rigid-body and full affine (e.g., nonrigid) transformations, as well as monomodal and multimodal image registration. FIG. 5 is a graphical depiction 500 illustrating an example of a plane of a 3D ultrasound image 502 and its mask 504.

To facilitate hardware acceleration, the image registration algorithm can be flexible providing for both unimodal and multimodal registration. An automatic image registration algorithm can be utilized to facilitate real time performance without user intervention. In particular, maximized mutual information (MI) between two images can be utilized, wherein the MI can be defined as a function of two images and a transformation matrix. By way of example, a 4×4 transformation matrix contains information about rotation, translation, scaling and shear, in a general case. The idea behind registration is to use an optimization algorithm that, given two images, finds the transformation matrix that maximizes MI between them. The MI calculation requires calculating the entropy of the images individually and jointly. This can be performed in three steps: applying the transformation to one of the two images, calculating the mutual histogram (MH) between the two images and calculating the MI from the MH. Utilizing MH to compute the individual entropies mitigates considering voxels outside of the volume of overlap for the MI calculation. MH calculation involves the voxels in a first image with their corresponding voxels in a second image. Since a voxel from the first image may not coincide with a voxel in the second image, interpolation may be needed. Interpolation also helps in obtaining sub-voxel accuracy. Recall that the formulas for the entropy and joint entropy are:

$$h(u) = -\Sigma p(x) \ln p(x)$$

$$h(u,v) = -\Sigma p(x,y) \ln p(x,y)$$

The probability p(x) of a voxel in an image having a given value x can be obtained from the image histogram. Similarly, the probability p(x,y) of a voxel in an image having a given value x, given that the voxel with the same image coordinates in the other image has a value y, can be obtained from the MH. MH calculation algorithms that do not require applying the image transformation matrix to one of the images before calculating the MH are desirable because they mitigate interpolation, and interpolation can introduce resampling noise to the image. Additionally, applying the image transformation matrix to one of the images before calculating the MH may also require enough temporary memory to store the whole image. Interpolation algorithms include nearest neighbor, trilinear interpolation and partial volume interpolation. Trilinear partial volume distribution (PV) interpolation may be utilized to interpolate weights which are added directly to the MH, instead of interpolating the values of the image being transformed into new gray-level values.

Figure 6:
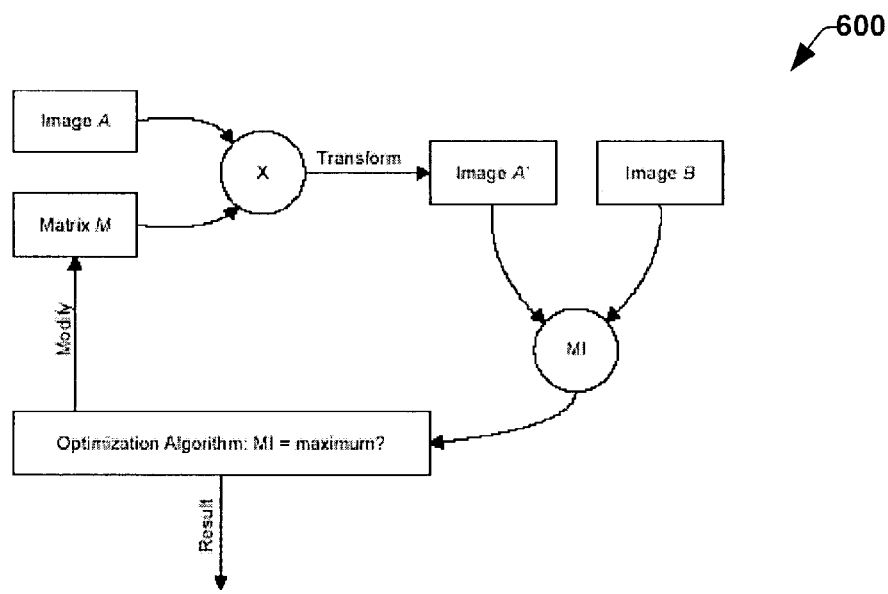
FIG. 6 illustrates a flow diagram for an algorithm accommodating the architecture described herein.

By way of example, a registration process can be performed between two images: Image A and Image B, wherein Image A can be transformed using a transformation matrix M into Image A'. The transformation matrix M is defined as:

$$M_{4\times 4} = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} = \begin{bmatrix} R_{3\times 3} & T_{3\times 1} \\ [0\ 0\ 0] & 1 \end{bmatrix}$$

where matrix R contains rotation, scaling and shear components of the transformation and column vector T contains the translation components. FIG. 6 illustrates a flow diagram 600 for an algorithm suitable for achieving a desired transformation and registration via execution on a 3D image registration architecture according to one or more aspects of the present invention.

The goal of the registration process is to find the transformation matrix that results in the best alignment between Image A' and Image B, which is called the reference image. This is performed by maximizing the MI function between Image A' and Image B by modifying the transformation matrix M. In order to calculate the MH, corresponding coordinates in Image A' of respective Image A voxels have to be found. This can be done by multiplying the coordinates vector of respective Image A voxels by M, but this requires performing a large amount of multiplications. Instead of applying matrix multiplication for every Image A voxel, the following property can be applied to calculate Image A' coordinates. Given an Image A voxel $v_A = [x_A y_A z_A 1]^T$ and its corresponding coordinates vector in Image A', $v_{A'} = M \cdot v_A$, the Image A' coordinates of the next voxel in the Image A along x-direction ($\hat{x}_A$) will be:

$$M \cdot \begin{bmatrix} x_A + 1 \\ y_A \\ z_A \\ 1 \end{bmatrix} = M \cdot (v_A + \hat{x}_A) = M \cdot v_A + M \cdot \hat{x}_A = v_{A'} + \begin{bmatrix} R_{11} \\ R_{21} \\ R_{31} \\ 0 \end{bmatrix}$$

This indicates that new coordinates can be obtained by performing a vector addition. The same holds true for neighboring voxels along the $\hat{y}_A$ and $\hat{z}_A$ directions:

$$M \cdot (v_A + \hat{x}_A) = v_A + [R_{11} R_{21} R_{31} 0]^T = v_A + \Delta v/\Delta x$$

$$M \cdot (v_A + \hat{y}_A) = v_A + [R_{12} R_{22} R_{32} 0]^T = v_A + \Delta v/\Delta y$$

$$M \cdot (v_A + \hat{z}_A) = v_A + [R_{13} R_{23} R_{33} 0]^T = v_A + \Delta v/\Delta z$$

where $\Delta v/\Delta x$, $\Delta v/\Delta y$, $\Delta v/\Delta z$ are the vector increments with respect to unit displacement of an Image A voxel along $\hat{x}_A$, $\hat{y}_A$ and $\hat{z}_A$ directions, respectively. FIG. 7 is a graphical depiction 700 illustrating the relationship between coordinates in Image A and Image A'. In order to apply this methodology, the Image A' coordinates of the first Image A voxel ($v_{Org}$) have to be calculated using matrix multiplication, whereas the rest are computed with numerically simpler matrix addition.

With regard to the MH calculation algorithm, given an Image A of dimensions max_x, max_y and max_z, that define the function A(x,y,z), which gives the value of the Image A at the coordinates x, y and z, and an Image B that defines the function B($v_{BAdd}$), which gives the value of Image B at the coordinates given by the integer vector $v_{BAdd}$, the following pseudocode describes the MH calculation algorithm that may be implemented in hardware architecture. FIG. 8 illustrates a table 800 describing variables used in the pseudocode.

$v_z = v_{Org}$

For $z = 0$ to max_z – 1

$v_y = v_z$ $v_z = v_z + \Delta v/\Delta z$

For $y = 0$ to max_y – 1

$v_x = v_y$ $v_y = v_y + \Delta v/\Delta y$

For $x = 0$ to max_x – 1

$v_x = v_x + \Delta v/\Delta x$ $v_B = \text{Int}(v_x)$ $v_{frac} = v_x - v_B$ $$W = \begin{bmatrix} v_{frac}(x) \cdot v_{frac}(y) \cdot v_{frac}(y) \\ v_{frac}(x) \cdot v_{frac}(y) \cdot (1 - v_{frac}(z)) \\ v_{frac}(x) \cdot (1 - v_{frac}(y)) \cdot v_{frac}(z) \\ v_{frac}(x) \cdot (1 - v_{frac}(y)) \cdot (1 - v_{frac}(z)) \\ (1 - v_{frac}(x)) \cdot v_{frac}(y) \cdot v_{frac}(z) \\ (1 - v_{frac}(x)) \cdot v_{frac}(y) \cdot (1 - v_{frac}(z)) \\ (1 - v_{frac}(x)) \cdot (1 - v_{frac}(y)) \cdot v_{frac}(z) \\ (1 - v_{frac}(x)) \cdot (1 - v_{frac}(y)) \cdot (1 - v_{frac}(z)) \end{bmatrix}$$

For $i = 0$ to 1

For $j = 0$ to 1

For $k = 0$ to 1

$v_{BAdd} = v_B + \begin{bmatrix} i \\ j \\ k \end{bmatrix}$

Figure 9:
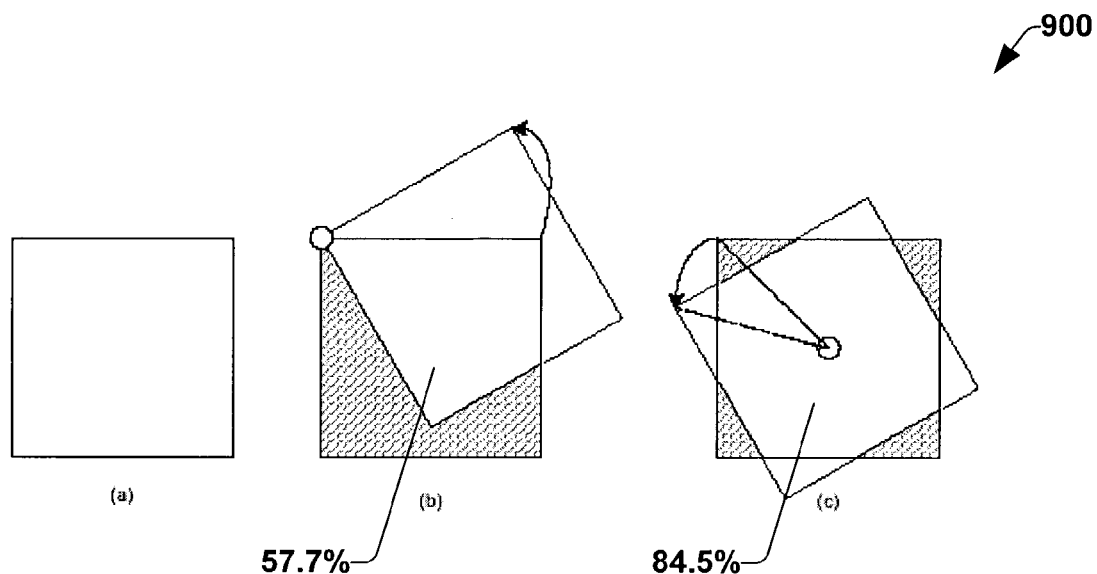
FIG. 9 illustrates the effect of origin position on image rotation and the difference of the origin position on image rotation outcome.

Int_Index = $7 - 4i - 2j - k$ $MH(A(x, y, z), B(v_{BAdd})) \mathrel{+}= W(\text{Int\_Index})$ The origin vector $v_{Org}$ is defined as the Image A' coordinates of the first Image A voxel ($[0001]^T$). One way to define this vector is to locate the center of rotation in one of the corners of Image A, but this can create a number of invalid voxels inside the transformed image. Another approach is to locate the center of rotation in the center of Image A. FIG. 9 is a graphical depiction 900 illustrating the effect of the origin position 900 on image rotation and the difference of the origin position on the image rotation outcome. After a 30 degrees rotation, FIG. 9(b) has 57.7% of valid pixels compared to 84.5% in FIG. 9(c). In the case of a 90 degrees rotation, the transformed image would have few valid voxels in the first case, while most voxels would still be valid in the second one. With the center of rotation located in [max_x/2 max_y/2 max_z/2 1]$^T$, the calculation of the first Image A voxel transformation is done as follows:

$v_{Org} = M[-\text{max\_}x/2 - \text{max\_}y/2 - \text{max\_}z/2 1]$ $\Rightarrow v_{Org} = T - \frac{1}{2}(\text{max\_}x\Delta v/\Delta x + \text{max\_}y\Delta v/\Delta x + \text{max\_}z\Delta v/\Delta x)$ It is to be appreciated that $v_{Org}$ can be situated outside of the Image A' boundaries and can be a factor on the accuracy assignment for the origin vector.

With regard to the precision of the MI calculation parameters, to obtain the MI of two images, the images and the transformation matrix that registers them are needed. In the algorithm described above, the transformation matrix is decomposed into four vectors ($\Delta v/\Delta x$, $\Delta v/\Delta y$, $\Delta v/\Delta z$ and $v_{Org}$). The first three of these vectors depend on rotation, scaling and shear, while the fourth depends on translation as well. Since column vectors of rotation matrices are unitary and since the first three vectors do not depend on the translation, their magnitude will only depend on scale and shear. Since shear is usually very small and scale is normally around 1, the maximum vector element value was chosen to be 4, which sets a maximum scaling parameter of 4x. Depending on the image transformation, some components of these vectors can be negative, which means that a 2's complement representation may be necessary.

The origin vector ($v_{Org}$) depends on the transformation parameters and represents the position in Image A' of the first (x=0, y=0, z=0) Image A voxel. Since the origin can be placed at any point of Image A' or in the outside region, the components of the origin vector may need to have an integer precision higher than the highest image dimension allowed (e.g., 256). The origin vector can also be positive or negative, meaning that a 2's complement representation may be necessary.

Figure 10:
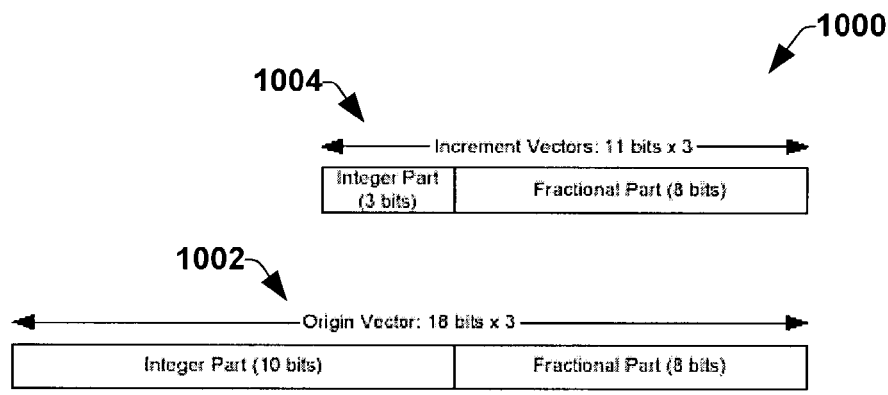
FIG. 10 illustrates word sizes for origin and increment vectors.

The accuracy of interpolation depends upon the number of fractional bits assigned to the four transformation vectors. Assigning zero fractional bits to the vectors means using a nearest neighbor interpolation, while using 15 bits would be equivalent to performing trilinear interpolation using single-precision floating-point accuracy. For one hardware implementation, an 8-bit fractional part can be chosen to perform trilinear interpolation. An analysis of the effect of using fixed-point arithmetics and the chosen precision is discussed later. FIG. 10 is a graphical depiction 1000 illustrating word sizes for the origin 1002 and increment 1004 vectors. Components of the increment vectors have a range from 4 to 3.996, while components of the origin vector have a range from −512 to 511.996, and both have a step size of 1/256.

With regard to the precision of the MH data, the MH is formed by accumulating a series of values that result from an interpolation operation. Since these values are lower than or equal to one, the MH numerical format supports fractional quantities. This can be accomplished utilizing fixed-point precision or floating-point precision. One criterion for determining the MH numerical format is the required dynamic range. For a 256×256×256 image, the sum of all the MH values will be $256^3$. If both images being registered have just one color, then the largest possible MH value is $256^3$ or $2^{24}$. The smallest non-zero MH value is most likely to be present during MH calculation and will be equal to the smallest interpolation weight, which is $2^{-8}$. This means that to represent all possible MH values using a fixed-point representation, 32 bits are needed.

High dynamic range requirements are usually handled using floating-point numbers. A floating-point representation may be applied to MH calculations if the calculation accuracy is maintained while keeping the bit count constant or lower. Floating-point standards include single precision and double precision floating-point standards, which require 32 and 64 bits per word, respectively. However, with floating-point representations, the MH can have values as large as $2^{24}$, where they are formed by adding values that are equal to or smaller than 1.

The single precision floating-point representation uses 23 bits for the mantissa. This means that if a number inside the MH is equal to or greater than $2^{23}$, the addition of a number that is smaller than or equal to 1 will have limited effect in the result. The number of bits in the mantissa needed to mitigate improper addition of interpolation weights to the MH is 32, which may not be accommodated by a floating-point representation.

One algorithm which may be utilized implements a double precision floating-point representation, which has 52 bits in the mantissa. Registration accuracy is not changed whether a 32-bit fixed point or a double-precision floating-point representation is used. The algorithm may be implemented with a C++ program applied to, for example, synthetic datasets, unprocessed 3D Ultrasound datasets and pre-processed 3D Ultrasound datasets. Floating-point precision can be utilized to test the operation of the algorithm and fixed-point precision can be utilized to model the accuracy of a hardware system, for example. These can be executed with a suitable processing arrangement (e.g., a dual-processor 1-GHz Pentium III Xeon workstation, with 1 GB of RAM and Windows NT 4.0 Workstation).

Figures 11, 12:
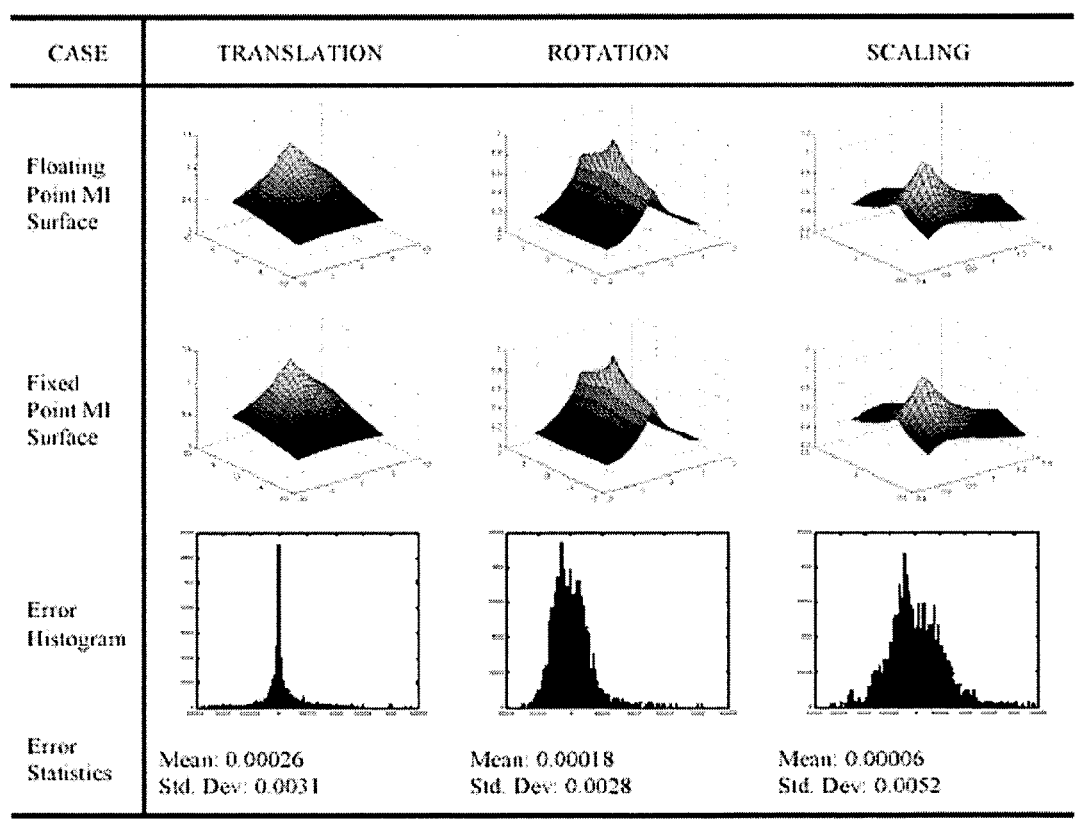
FIG. 11 illustrates a table depicting MI software calculation times for different image sizes.
FIG. 12 illustrates a table comparing MI surfaces obtained using floating-point and fixed-point implementations of an exemplary algorithm.

Both the registration time of software providing the algorithm and registration accuracy can be tested. Software registration time can be tested to evaluate application of a hardware implementation of the MH to real-time registration. Since the number of iterations for registering two images varies depending on the images being registered and their misalignment, the MI calculation time can be chosen as a benchmark of registration performance. FIG. 11 illustrates a table 1100 depicting examples of MI software calculation times for different image sizes. Since the registration of two images usually takes between 300 and 1500 iterations, it can be concluded from what is shown in FIG. 11 that real-time image registration is likely not possible with conventional PC technology.

The accuracy of registration depends on the characteristics of the mutual information surface. FIG. 12 illustrates a table 1200 comparing MI surfaces obtained using floating-point and fixed-point implementations of the algorithm. The fixed-point implementation corresponds to a hardware implementation. The mean error is positive because it is introduced by rounding down the interpolation weights. However, registration accuracy is not affected because the MI surface shape is unchanged.

Figure 13:
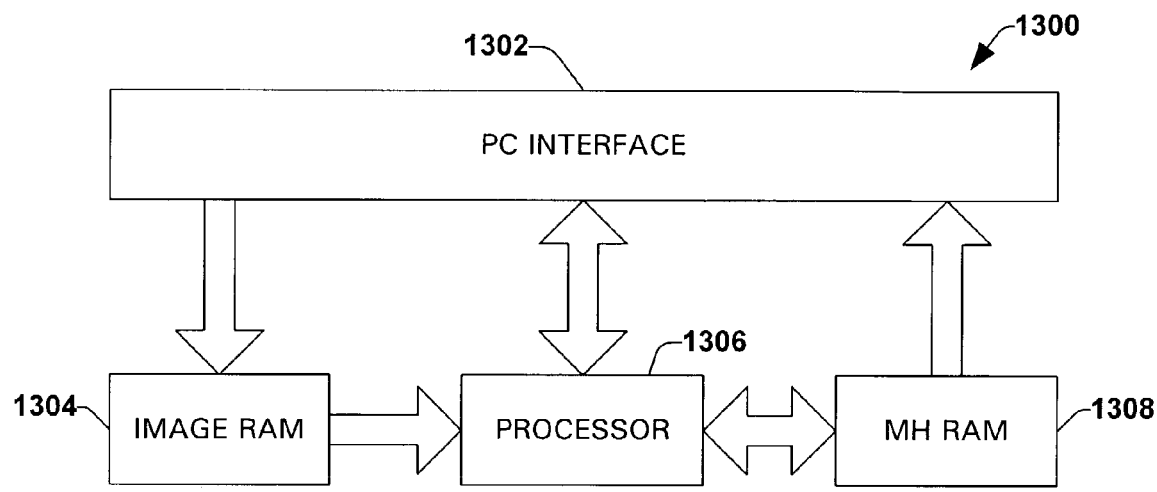
FIG. 13 illustrates a top-level block diagram of a hardware architecture system according to one or more aspects of the present invention.

FIG. 13 is a schematic block diagram illustrating a high-level depiction 1300 of a hardware architecture system according to one or more aspects of the present invention. The system facilitates real-time 3D image registration by mitigating bottlenecks related to MI calculations performed on computers. MH calculations are sped up via parallelism and pipelining. The diagram depicts the basic system blocks and the flow of data through them. A PC interface 1302 stores image data inside an Image RAM 1304 and configures a MH processor 1306. The MH processor 1306 accesses the Image RAM 1304 and utilizes MH RAM 1308 as an accumulator to obtain MH values. The PC interface 1302 reads the MH values from the MH RAM 1308.

The Image RAM 1304 is capable of containing both images to be registered. When dealing with 9-bit images of up to $256^3$ voxels, for example, the size of the Image RAM 1304 is 32M×16 bits. It can be divided into two parts—one to store Image A and the other to store Image B, where Image A is transformed and compared against Image B. It is to be appreciated, however, that while the Image RAM 1304, MH Processor 1306 and MH RAM 1308 are illustrated as single elements, one or more of them may comprise multiple elements to facilitate enhanced processing. Image A can be accessed sequentially or one voxel at a time, while Image B can be accessed randomly. Also, a 2×2×2 neighborhood of Image B can be accessed to perform interpolation. This may lead to different addressing and access schemes in the implementation of the architecture. Image A can be stored in a single 16M×16 sequential-access RAM module, while Image B can be stored using a cubic-addressing scheme with eight random-access RAM modules.

The MH RAM 1308 can contain, for example, $256^2$ values with a high dynamic range (e.g., 32 bits). This RAM can be accessed (e.g., including read and write operations) up to 16 times per Image A voxel access, such that the type of RAM utilized to implement this memory is inherently faster than the type used to store the two images.

The MH processor 1306 performs, among other things, the functions of address generation, memory control, interpolation and accumulation. With regard to address generation, for each address in Image A, an address in Image B is calculated. This can be accomplished by increasing vectors (e.g., as described above with regard to pseudocode). Calculating addresses yields Image B addresses and the values to be interpolated and added to the MH. With regard to memory control, the processor 1306 controls the access and refresh of the Image RAM 1304 and MH RAM 1308 and clears the contents of the MH RAM 1308 at the beginning of each MH calculation. As relates to interpolation, the values added to the MH are calculated from the fractional position of Image A voxels in Image B. With regard to accumulation, for changes in the MH, the processor 1306 reads the MH RAM 1308, adds a value obtained through interpolation and writes it back to the MH RAM 1308.

For respective Image A voxels, a MH calculation algorithm can perform the following operations on the foregoing architecture to facilitate image access parallelization:

Read Image A voxel
If voxel is valid (mask=1)
Generate Image A' coordinates
If coordinates are valid
  Interpolate
  Read Image B neighborhood
  Accumulate into MH Multiple memory accesses may be necessary to perform these operations. By way of example, 25 memory accesses may be necessary: one to read the Image A voxel, eight to read the Image B neighborhood and sixteen to accumulate the interpolation weights into the MH RAM (e.g., 8 reads and 8 writes). Additionally, accesses may be random and may not benefit from memory burst accesses or memory caching schemes. Because of this, some access may depend almost exclusively on bus speed. Since memory access time does not evolve according to Moore's Law, conventional architectures can not be expected to significantly reduce MI based registration times. The time for MH calculation, assuming the accesses are made sequentially and take the same time, is:

$$t_{MH} = 25 N_{voxels} t_{Access}$$

For a $128^3$ image, the total calculation time is $t_{MH} \approx 524 \cdot 10^6 \times t_{Access}$. If both images are stored in SDRAMs and the MH RAM is implemented using fast SRAM, an average access time is:

$$t_{Access} = \frac{9 \cdot 80 \text{ ns} + 16 \cdot 10 \text{ ns}}{25} = 35.2 \text{ ns}$$

For an average access time of 35.2 ns, the total MH calculation time is 1.84s, which is about 1.8 times faster than that which can be obtained conventionally (e.g., via Pentium III computer). Time savings can be enhanced by accessing both Image RAM 1304 and the MH RAM 1308 simultaneously (e.g., using cubic addressing for Image B), such that total MH calculation time is:

$$t_{MH} = N_{voxels} \cdot t_{MaxAccess}$$

where $$t_{MaxAccess} = \max(t_{ImgAccess}, 16 \cdot t_{MHAccess})$$

and $t_{ImgAccess}$ and $t_{MHAccess}$ are the image RAM access time and the MH RAM access time, respectively. Using the same access times as in the sequential access case, $t_{MaxAccess} = 16 t_{MHAccess} = 160$ ns, which means that for a $128^3$ image, $t_{MH} = 0.33$s, which is about 10 times faster than that which is conventionally afforded. This speed-up can be increased by using parallel RAM modules for the MH. By way of example, the speed-up can be doubled with two parallel RAM modules, in which case the 16 MH access operations take as long as the image access operations (e.g., 80 ns).

According to one or more aspects of the present invention, efficient image level parallelization can be achieved through distributed processing. Image A can be divided into a plurality of sub-volumes and distributed among multiple processors. Respective processors calculate a portion of the MH, and after the modules are done, the MH of Image A is obtained by adding portions corresponding to the processors. The benefit from parallelization is calculated using the following equations: given $t_{vox}$, the MH calculation time per voxel, $t_{add}$, the time it takes to add two MH values, $n^3$, the number of voxels in Image A, and m, the number of processors, the total MH calculation time will be:

$$T_{MH} = t_{vox} \cdot \frac{n^3}{m} + 256^2 \cdot f(m) \cdot t_{add}$$

The first part of this equation is the time it takes for respective processors to calculate portions of the MH, while the second part is the time required to add the MH portions. f(m) is the number of additions necessary to add m numbers, and depends on the topology of the MH addition network. For a linear array $f(m)=m-1$, while for a binary tree $f(m)=\log_2(m)$. Since $t_{vox}$ depends mostly on the Image RAM access time and $t_{add}$ depends on the processor speed, it can be assumed that $t_{vox} \approx 10 t_{add}$. If all memory accesses take the same time $t_{vox}$, then the speed-up factor of an implementation with m processors with respect to a computer is the following:

$$SpeedUp = \frac{25 \cdot n^3}{(n^3/m) + 256^2 \cdot f(m)/10}$$

Figure 14:
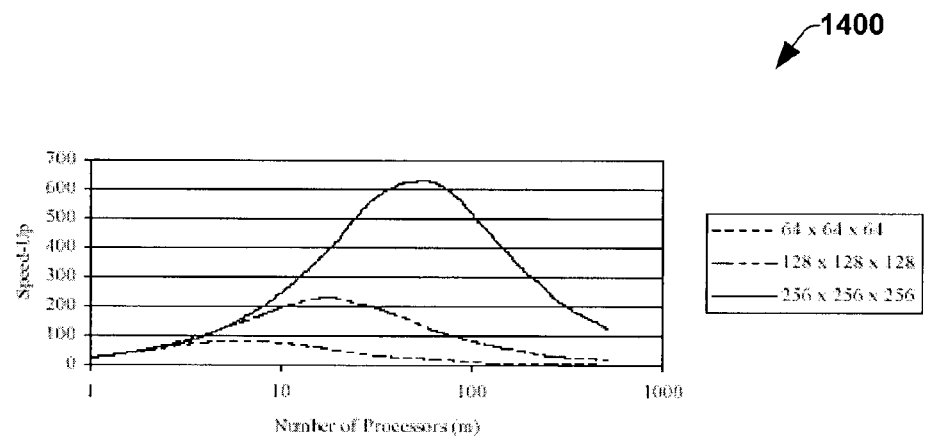
FIG. 14 graphically illustrates an expected speed-up factor vs. number of processors for different image sizes using a linear array topology.
Figure 15:
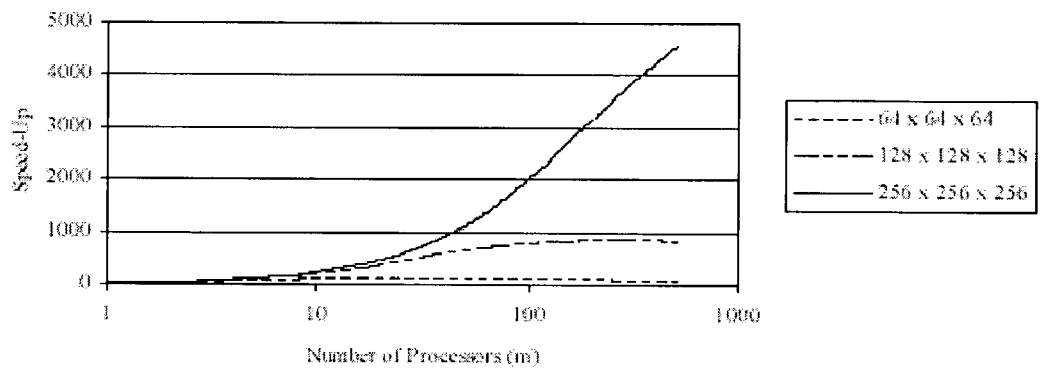
FIG. 15 graphically illustrates an expected speed-up factor vs. number of processors for different image sizes using a binary tree topology.
Figure 16:
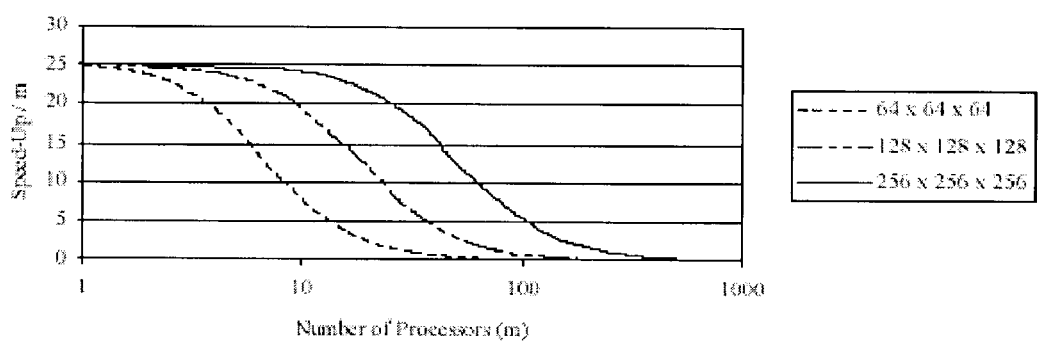
FIG. 16 graphically illustrates an expected speed-up factor per processor vs. number of processors using a linear array topology.
Figure 17:
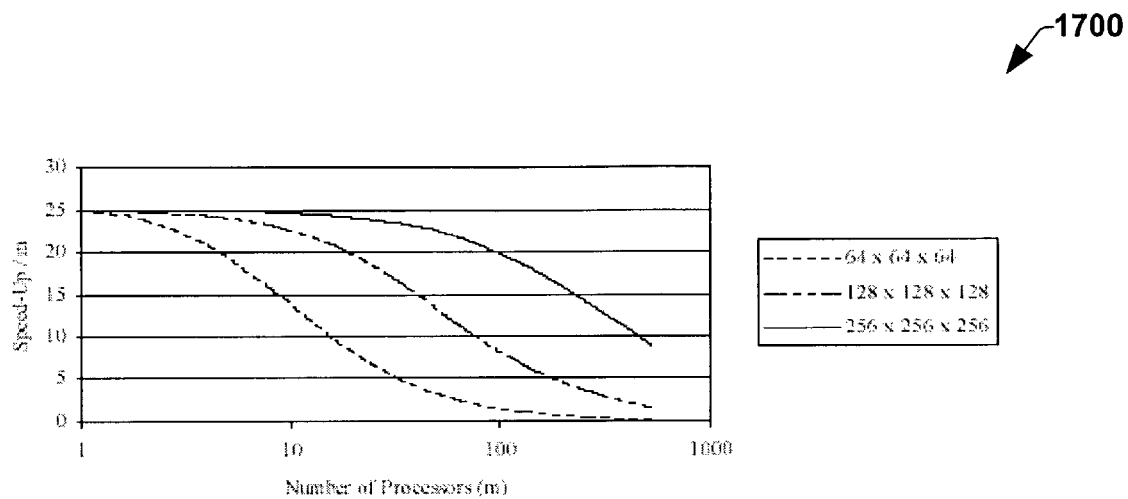
FIG. 17 graphically illustrates an expected speed-up factor per processor vs. number of processors using a binary tree topology.

FIG. 14 is a graphical depiction 1400 illustrating the expected speed-up factor vs. number of processors for different image sizes using a linear array topology. FIG. 15 is a graphical depiction 1500 illustrating the expected speed-up factor vs. number of processors for different image sizes using a binary tree topology. It can be appreciated that binary tree topologies can achieve great speed up as compared to linear arrays when utilizing large numbers of processors. FIG. 16 is a graphical depiction 1600 illustrating the expected speed-up factor per processor vs. number of processors using a linear array topology. FIG. 17 is a graphical depiction 1700 illustrating the expected speed-up factor per processor vs. number of processors using a binary tree topology. It can be appreciated that processor utilization is enhanced when the number of processors is smaller than or equal to 10.

Figure 18:
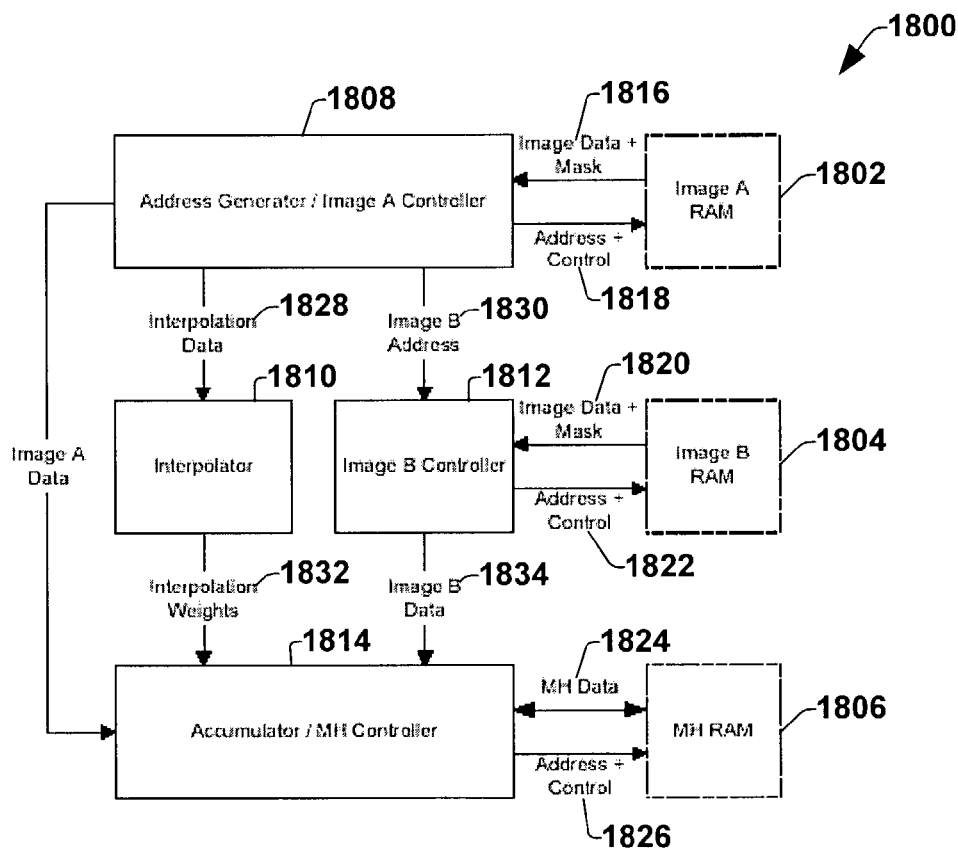
FIG. 18 is a block diagram illustrating stages of a hardware pipeline according to an aspect of the present invention.

FIG. 18 is a block diagram illustrating an exemplary hardware pipeline 1800 in accordance with one or more aspects of the present invention. The pipeline can be designed in a way such that respective stages process different voxels of Image A at a given time. Memory access is parallel, meaning that there are different RAMs for Image A, Image B and the MH, namely Image A RAM 1802, Image B RAM 1804 and MH RAM 1806. The Image A RAM 1802, Image B RAM 1804 and MH RAM 1806 are arranged for operable communications with an address generator/Image A controller 1808, interpolator 1810, Image B controller 1812 and accumulator/MH controller 1814. In particular, the address generator/Image A controller 1808 accesses the Image A RAM 1802 for image data+mask 1816 and sends address+control 1818 to the Image A RAM 1802. The Image B controller 1812 likewise receives image data+mask 1820 from the Image B RAM 1804 and sends address+control 1822 to the Image B RAM 1804. Similarly, the accumulator/MH controller 1814 sends address+control 1826 to the MH RAM 1806 and sends MH data 1824 to and receives MH data 1824 from the MH RAM 1806. Additionally, the address generator/Image A controller 1808 sends interpolation data 1828 and Image B address 1830 to the interpolator 1810 and Image B controller 1812, respectively. And, the interpolator 1810 and Image B controller 1812 respectively send interpolation weights 1832 and Image B data 1834 to the accumulator/MH controller 1814. The accumulator/MH controller 1814 also receives Image A data from the address generator/Image A controller 1808.

It will be appreciated that the address generator/Image A controller 1808 calculates the Image B address and interpolation values during the Image A access. Additionally, the interpolator 1810 calculates the values to be added to the MH while the Image B controller 1812 loads corresponding Image B values, and the accumulator/MH controller 1814 increases values in the MH. For respective Image A accesses in the first stage, eight Image B accesses occur in the second stage and 16 MH RAM accesses occur in the third stage. In order to make the stage latency and the Image A access time equal, the Image B accesses are done in parallel. Cubic addressing can, for example, be implemented in Image B RAM 1804 to facilitate this. Preferably, the RAM utilized for the MH RAM 1806 is faster than the RAM used for both the Image A RAM 1802 and Image B RAM 1804. The interpolation of sets of data corresponding to respective voxels should be performed in less or equal time than an Image RAM access. The time for the accumulator/MH controller 1814 to add the interpolation weights 1832 to the MH data is very small compared to the RAM access time, or is done in parallel with the MH accesses.

According to one or more aspects of the present invention, a 3-D image registration system may be implemented in a field-programmable gate array (FPGA) board architecture. With regard to RAM, since a large amount of memory is required (e.g., as per the MH processor 1306 depicted in FIG. 13 requiring RAM to store two images and the MH), on-chip RAM (e.g., implemented as a custom one-chip VLSI implementation) or external RAMs can be utilized. While VLSI may be fast, such implementations may also be expensive. FIG. 19 illustrates a table 1900 comparing aspects of different RAM implementations.

With regard to processors, MH calculation speed is a function of the number of simultaneous, parallel memory accesses available. As a result, an important consideration pertaining to processors is parallel memory access capabilities as opposed to mere processing speed. FIG. 20 illustrates a table 2000 comparing aspects of different processor implementations. It can be seen that field programmable gate array (FPGA) can perform multiple memory accesses in parallel. Accordingly, an FPGA-based processor implementation would be very appropriate as it would facilitate desired performance. Additionally, since speed is dependent upon the maximum between the Image access time and 16 times the MH access time, the Image RAM has a slightly more relaxed access time requirement. Accordingly, a very fast RAM (e.g., Synchronous Fast SRAM) can be utilized to implement MH RAM, while SDRAM may be utilized for the Image RAM.

Figure 21:
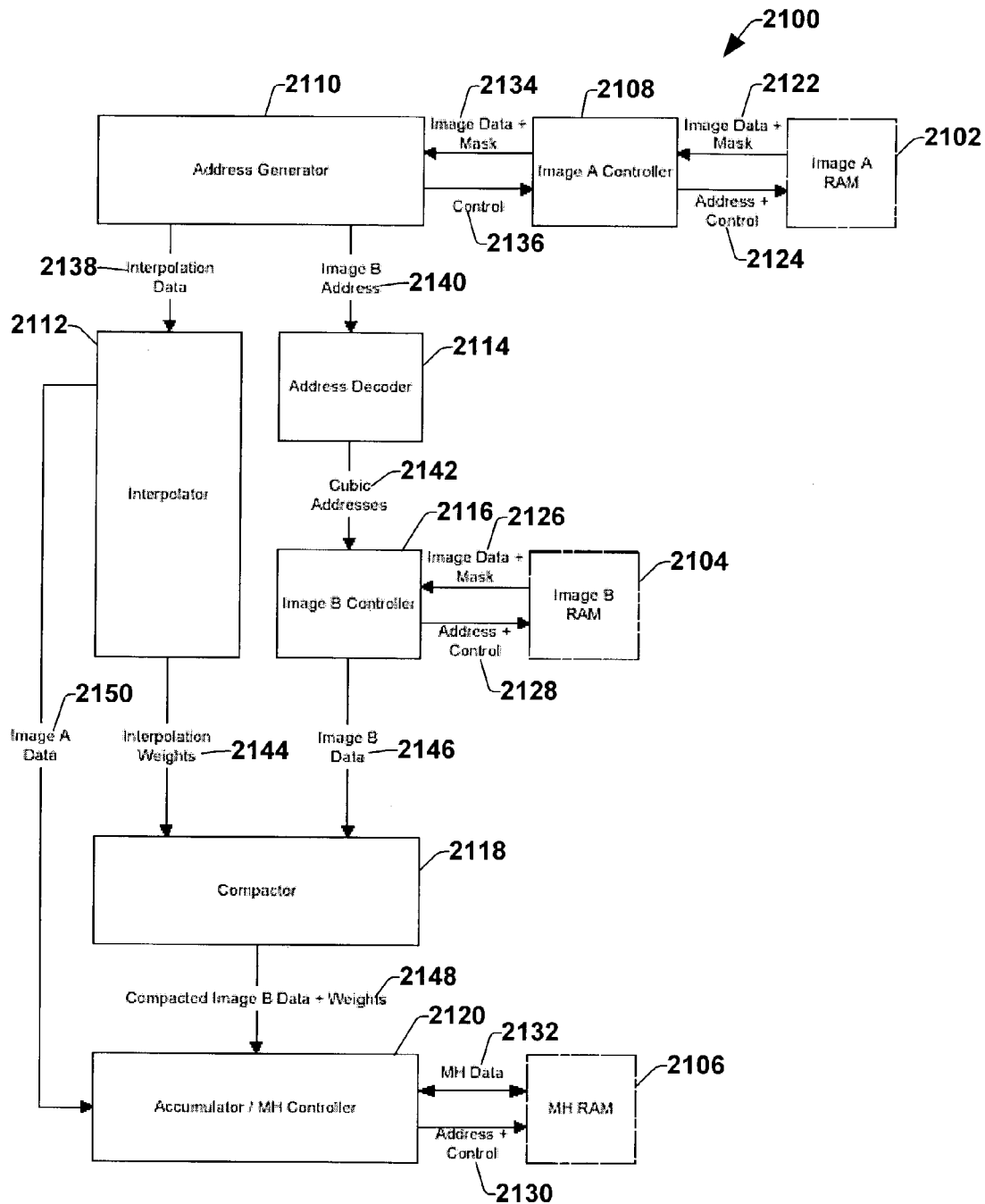
FIG. 21 is a block diagram illustrating a 5-stage pipeline configuration that facilitates data throughput in accordance with one or more aspects of the present invention.

FIG. 21 is a block diagram 2100 illustrating an exemplary 5-stage pipeline configuration 2100 that facilitates enhanced data throughput in accordance with one or more aspects of the present invention. The configuration 2100 includes Image A RAM 2102, Image B RAM 2104 and MH RAM 2106. The Image A RAM 2102, Image B RAM 2104 and MH RAM 2106 are arranged for operable communications with an Image A controller 2108, address generator, 2110, interpolator 2112, address decoder 2114, Image B controller 2116, compactor 2118 and accumulator/MH controller 2120. In particular, the Image A controller 2108 accesses the Image A RAM 2102 for image data+mask 2122 and sends address+control 2124 to the Image A RAM 2102. The Image B controller 2116 likewise receives image data+mask 2126 from the Image B RAM 2104 and sends address+control 2128 to the Image B RAM 2104. Similarly, the accumulator/MH controller 2120 sends address+control 2130 to the MH RAM 2106 and sends MH data 2132 to and receives MH data 2132 from the MH RAM 2106. Additionally, the Image A controller 2108 sends image data+mask 2134 to the address generator 2110 and receives control signals 2136 from the address generator 2110. The address generator 2110 also sends interpolation data 2138 and Image B address 2140 to the interpolator 2112 and address decoder 2114, respectively. The address decoder 2114 sends cubic addresses 2142 to the Image B controller 2116. The interpolator 2112 and Image B controller 2116 respectively send interpolation weights 2144 and Image B data 2146 to the compactor 2118. The compactor 2118 sends compacted Image B data+weights 2148 to the accumulator/MH controller 2120. The accumulator/MH controller 2120 also receives Image A data 2150 from the interpolator 2112.

It will be appreciated that two stages of the pipeline 2100 do not execute memory accesses. In particular, a second stage decodes the Image B address 2140 given by the address generator 2110 and gives the cubic addresses 2142 to the Image B controller 2116, while a fourth stage compactor 2118 reduces the number of MH RAM accesses by adding the interpolation weights 2144 corresponding to equal Image B values. The time required for stages to complete respective jobs can be chosen to be 10 clock cycles (e.g., 100 ns at 100 MHz). This time may, for example, be the minimum required to perform random accesses to the Image B SDRAMs.

With respect to individual blocks of the system, the Image A controller (IAC) 2108 performs SDRAM initialization at startup, wherein the IAC executes an Image A SDRAM startup sequence. The IAC 2108 also controls refresh by periodically issuing a refresh command to the Image A SDRAM (e.g., once every 8 μs). The IAC further facilitates image loading by allowing sequential loading of the Image A to the SDRAM. And, the IAC facilitates sequential image access by controlling the data flow from the Image A SDRAM to the system pipeline. The MH algorithm accesses the Image A in a sequential order, which allows for the use of burst accesses to the SDRAM, thus enabling rapid discarding of Image A voxels that are outside the volume of interest (e.g., masked voxels).

The IAC 2108 generally includes four blocks (not shown): an address counter, a refresh counter, a state machine and a FIFO. The address counter is reset before starting to load the image and before starting the MH calculation. The refresh counter tells the state machine when to issue a refresh command. The state machine controls the SDRAM access, issuing the commands, controlling the data bus and latching the incoming data. The FIFO serves as an interface between the IAC 2108 and the address generator 2110. The FIFO can contain, for example, 8 Image A values. Whenever the FIFO contains less than 4 values, the state machine issues a burst transfer command to the SDRAM and retrieves 4 more values. When the address counter is cleared, the FIFO is emptied and new values are retrieved from the SDRAM.

The address generator (AG) 2110 performs the first part of the interpolation algorithm: it calculates the coordinates in Image B of voxels on Image A. Exemplary pseudocode of the operation of the AG 2110 is as follows:

$v_z = v_{Org}$

For z=0 to max_z−1

$v_y = v_z$ $v_z = v_z + \Delta v/\Delta z$

For y=0 to max_y−1

$v_x = v_y$ $v_y = v_y + \Delta v/\Delta y$

For x=0 to max_x−1

$v_x = v + \Delta v/\Delta x$

Where $v_{Org}$ is the coordinates vector that corresponds to the position in Image B of the first Image A voxel, and $\Delta v/\Delta x$, $\Delta v/\Delta y$ and $\Delta v/\Delta z$ are the vector increments with respect to a displacement of Image A voxels in the x, y and z directions, respectively. The vector $v_x$ is composed of three 18-bit signed fixed-point values, each with 10 bits for the integer part and 8 bits for the fractional part. The integer part corresponds to the address of the corresponding Image B value, while the fractional parts are used to interpolate the weights to be added to the MH. A signed representation that allows values in the [−512, 511] range can be used, for example, because the Image B address of some Image A voxels can be outside Image B boundaries. If a voxel's calculated address is outside Image B boundaries or if it is masked in Image A, then the calculated address is not passed to the blocks that follow. This effectively speeds up the MH calculation, because the AG 2110 may need just 5 clock cycles to calculate a new address, which is half the pipeline latency of other blocks.

Figure 22:
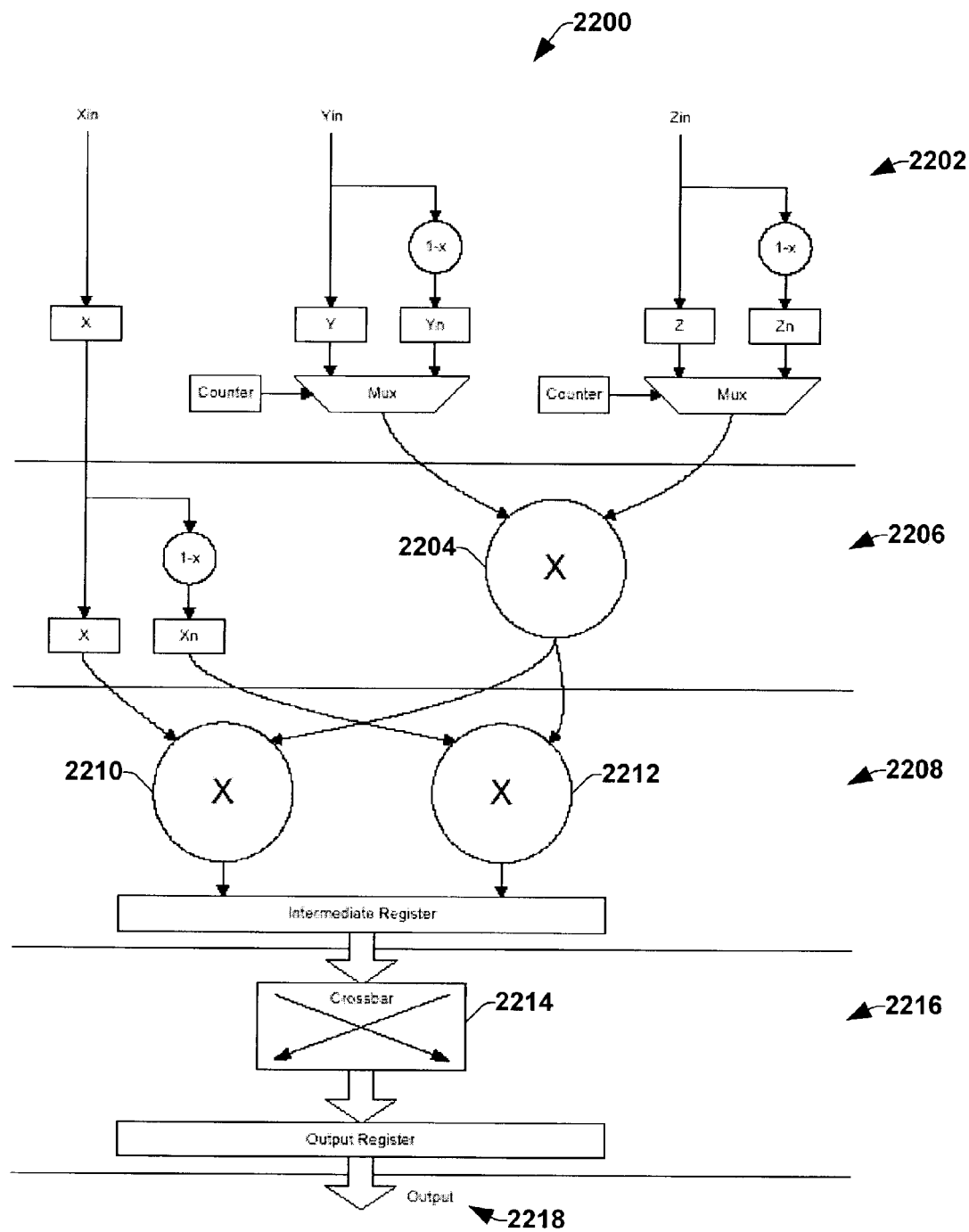
FIG. 22 illustrates an arithmetic pipeline of an interpolator according to one or more aspects of the present invention.

The interpolator 2112 calculates the weights to be added to the MH. It generally includes an arithmetic pipeline, an illustration 2200 of which is depicted in FIG. 22. The interpolator 2112 is designed to minimize the number of multipliers, since they require significant resources inside the FPGA. A first stage 2202 of the pipeline 2200 depicted in FIG. 22 calculates complements of the y and z coordinates and sends y, z and their complements to a multiplier 2204 in a second stage 2206 in a sequential order to calculate yz, y$\bar{z}$, $\bar{y}$z and $\bar{y}\bar{z}$ products. A third stage 2208 includes two multipliers 2210, 2212, which are in charge of multiplying x and $\bar{x}$ with the results from the second stage 2206. A crossbar 2214 in a fourth stage 2216 of the pipeline 2200 shuffles the results in order to relate them to their corresponding Image B values via an output 2218.

Figure 23:
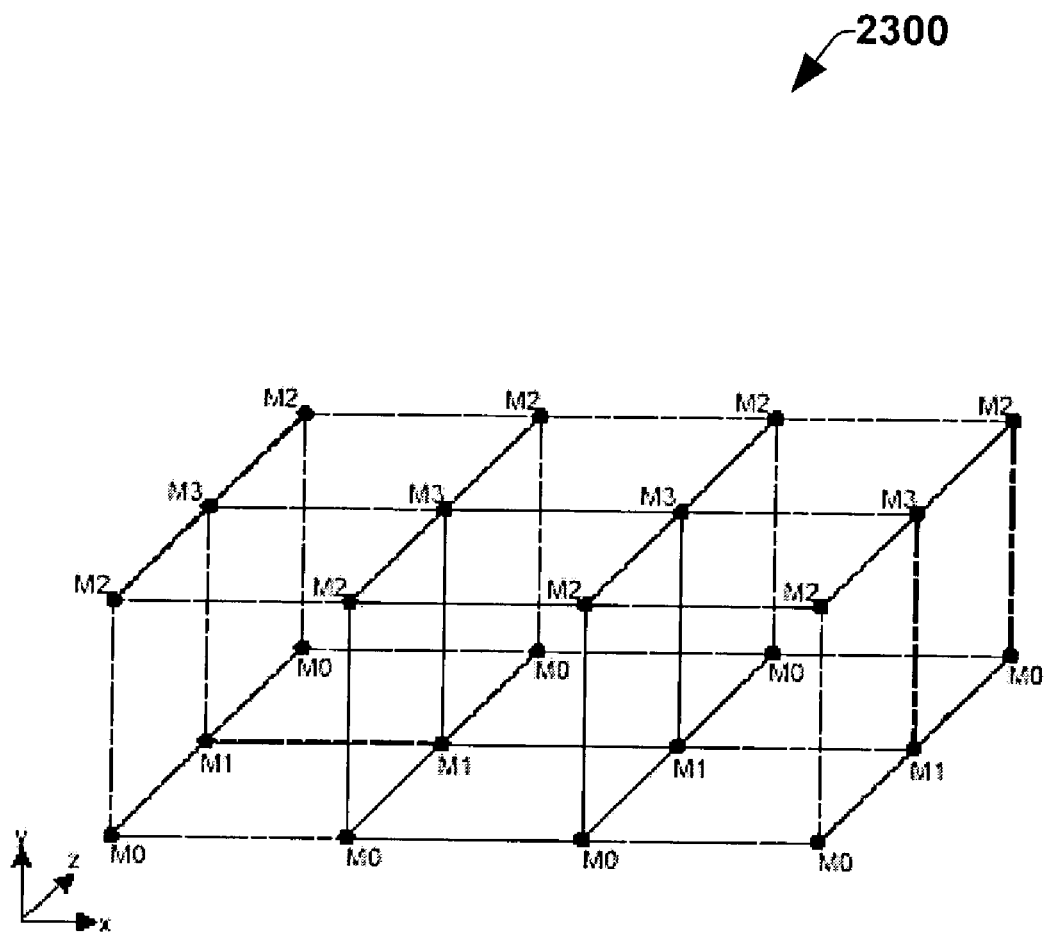
FIG. 23 illustrates an exemplary addressing scheme for an image, Image B.

The address decoder 2114 of FIG. 21 converts the Image B coordinates given by the AG 2110 to cubic addresses 2142, which are used to access the Image B SDRAMs. Four 4M×16 SDRAMs can, for example, be utilized to store Image B. By way of example, FIG. 23 is a graphical depiction 2300 illustrating an Image B addressing scheme. The SDRAMs can be accessed using a burst length of 2, which gives both z-coordinate values. Random access to an SDRAM takes the same time for burst lengths less than or equal to 4. The initial burst memory addresses for a neighborhood that starts in the vortex ($V_x$, $V_y$, $V_z$) can be calculated using the following formulas:

$$M_x = \frac{V_x}{2} + V_x \bmod 2$$

$$M_y = \frac{V_y}{2} + V_y \bmod 2$$

$$U_x = \frac{V_x}{2} \quad U_y = \frac{V_y}{2}$$

$$M0: (M_x, M_y, V_z) \quad M1: (U_x, M_y, M_z)$$

$$M2: (M_x, U_y, V_z) \quad M3: (U_x, U_y, V_z)$$

With regard to the Image B controller (IBC) 2116, the read accesses to the Image B SDRAMs are random, and the addresses are read from the AD 2114.

Figure 24:
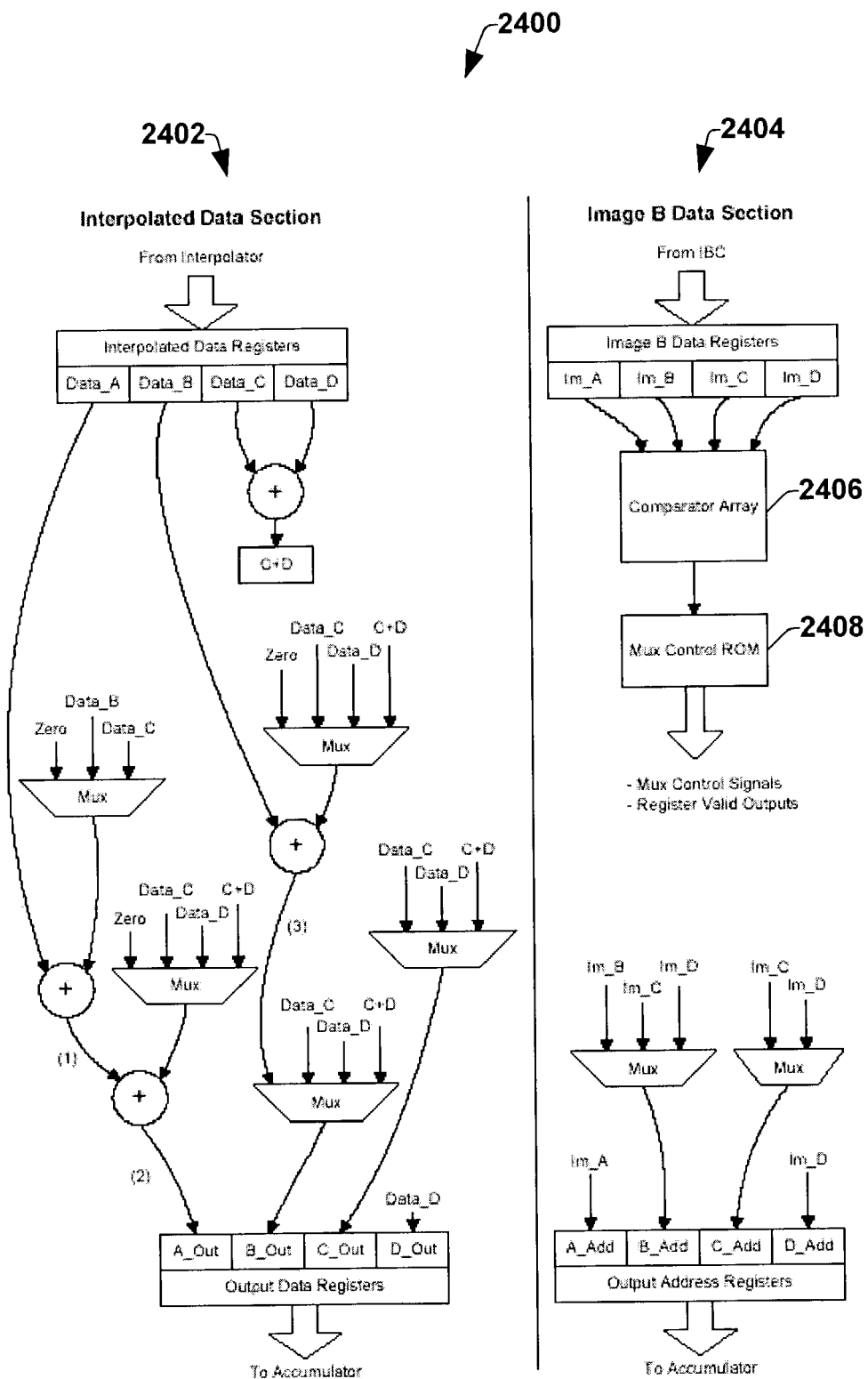
FIG. 24 illustrates a data-flow diagram of a compactor according to one or more aspects of the present invention.

With regard to the compactor 2118, the compactor 2118 reduces the number of accesses to the MH RAM 2106 by adding the interpolated values corresponding to the same Image B values. By way of example, two compactors may be utilized, one per MH RAM chip. The compactor 2118 includes two sections: an interpolated data section and an image data section. FIG. 24 illustrates an exemplary dataflow diagram 2400 depicting these two sections 2402, 2404. The image data section 2404 receives Image B values (e.g., 4) and compares them using an array of comparators (e.g., 6). The result of the comparators 2406 is used as an address for a ROM, whose output is used to control the interpolated data section 2402.

The compactor 2118 receives Image B values (e.g., 4) from the IBC 2116 and their corresponding interpolated values 2144 from the interpolator 2112. The Image B values are compared to one another in the comparator array, which accesses the mux control ROM 2408. The multiplexers facilitate control over the addition of interpolated values and the storing of the results in output registers. FIG. 25 illustrates a table 2500 depicting exemplary relationships between compactor 2118 inputs and outputs as may be implemented within a decision-making algorithm. The number of valid outputs depends on the number of equal Image B values. If all values are equal, then only one output is valid (A_Out). If just three values are equal or there are two pairs of equal values, then the two outputs are valid (A_Out and B_Out). If only two values are equal, then three outputs are valid (A_Out, B_Out and C_Out). If all Image B values are different, then all the four outputs are valid.

With regard to the accumulator 2120, the accumulator 2120 generally performs three functions: clearing and initialization of the MH RAM 2106, accumulation of the interpolated values into the MH RAM and downloading of the MH from the RAM modules. The module generally includes a state machine and a RAM clearing counter (not shown). During the MH RAM 2106 initialization, the module initializes all the RAM values to 0. When new data is available for storing in the MH RAM 2106, the accumulator 2120 reads current RAM values, adds the new values to the previous ones and then stores the results back into the MH RAM 2106. When the MH RAM 2106 is accessed for downloading, the accumulator 2120 reads the RAM values sequentially and clears them after reading them. This leaves the MH RAM 2106 cleared and ready for another MH calculation after accessing the results of the previous one.

The PC interface 1302 shown in FIG. 13 facilitates communication of the system with an external host. The system supports 16-bit instructions from the external host. FIG. 26 is a graphical depiction 2600 illustrating an instruction word format. Data bits (e.g., 11 bits) are aligned to the right in the example shown and are utilized to load the transformation parameters and the image data. Since the origin vector components can have a size of 18 bits, for example, two instructions may be required to load them, with the first loading a 10-bit integer part and the second loading an 8-bit fractional part. FIG. 27 illustrates a table 2700 depicting a list of valid command instructions according to one or more aspects of the present invention.

Figure 28:
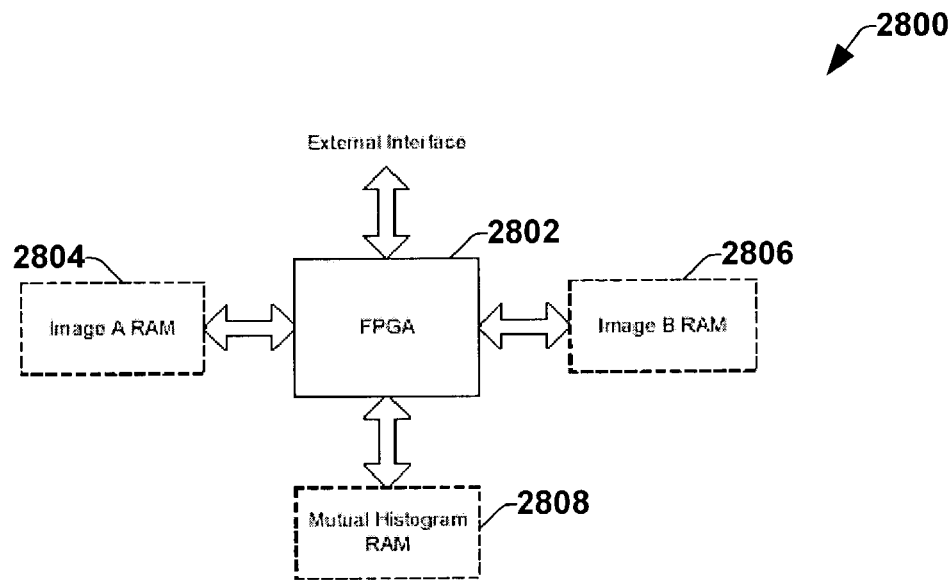
FIG. 28 is a block diagram illustrating a single FPGA architecture.

The system can be partitioned to facilitate pin connections to external RAM and fit the system to field-programmable gate arrays (FPGAs) and simplify PCB layout. By way of example, one FPGA can be utilized to contain logic internal to the system (e.g., exclusive of external RAM). FIG. 28 is a block diagram 2800 illustrating such a single FPGA 2802 architecture. Such an approach can give a small chip count, but can also require the use of an FPGA with numerous output pins (e.g., around 340). And, while FPGAs with many I/O pins are available (e.g., Altera, APEX or similar), they can be expensive. Additionally, high density of interconnections can complicate the design of a high-speed board with respect to routing high-speed signals out of the FPGA into the external RAMs 2804, 2806, 2808.

Figure 29:
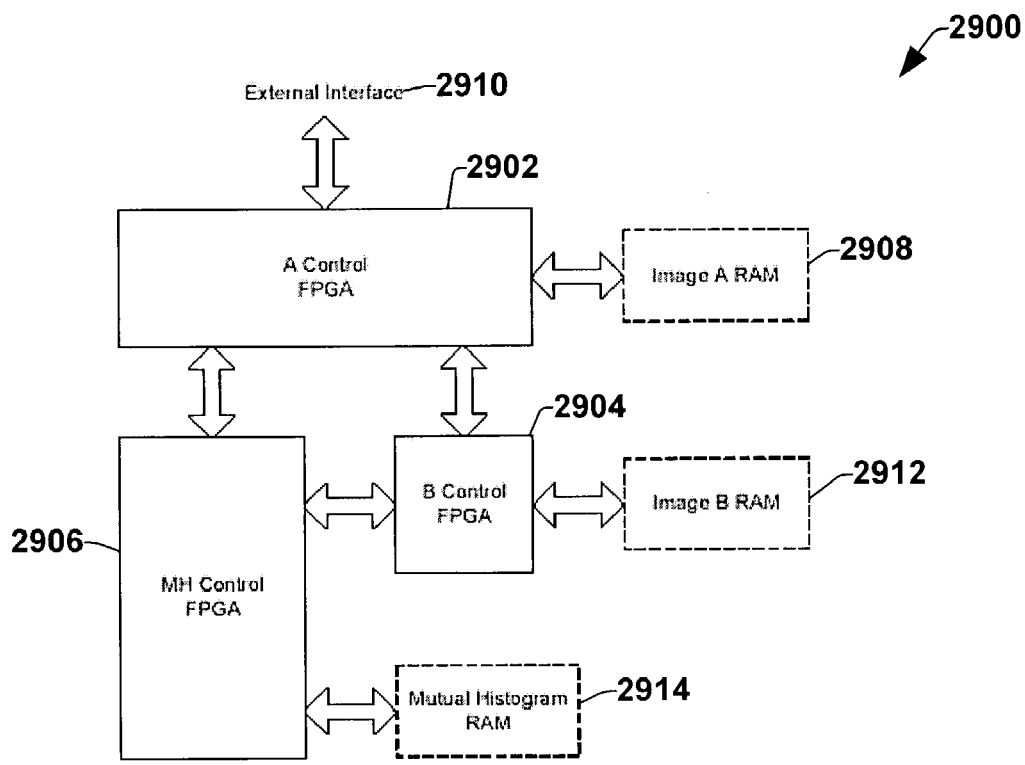
FIG. 29 is a block diagram illustrating an external image RAM controller architecture.

By way of further example, external image RAM can be utilized to comprise an external image RAM controller architecture. FIG. 29 is a block diagram 2900 illustrating such an approach, wherein multiple (e.g., three) FPGAs 2902, 2904, 2906 can be used: one 2902 to control Image A 2908 and the external interface 2910, one 2904 to control the Image B RAMs 2912 and one to control the MH RAMs 2914. Such an approach can yield a higher chip count than utilizing a single FPGA, but can be less costly and have a simpler PCB layout. However, synchronizing the signals between the FPGA 2904 that controls the Image B RAMs 2912 and the one 2906 that accesses the MH 2914 can be difficult.

Figure 30:
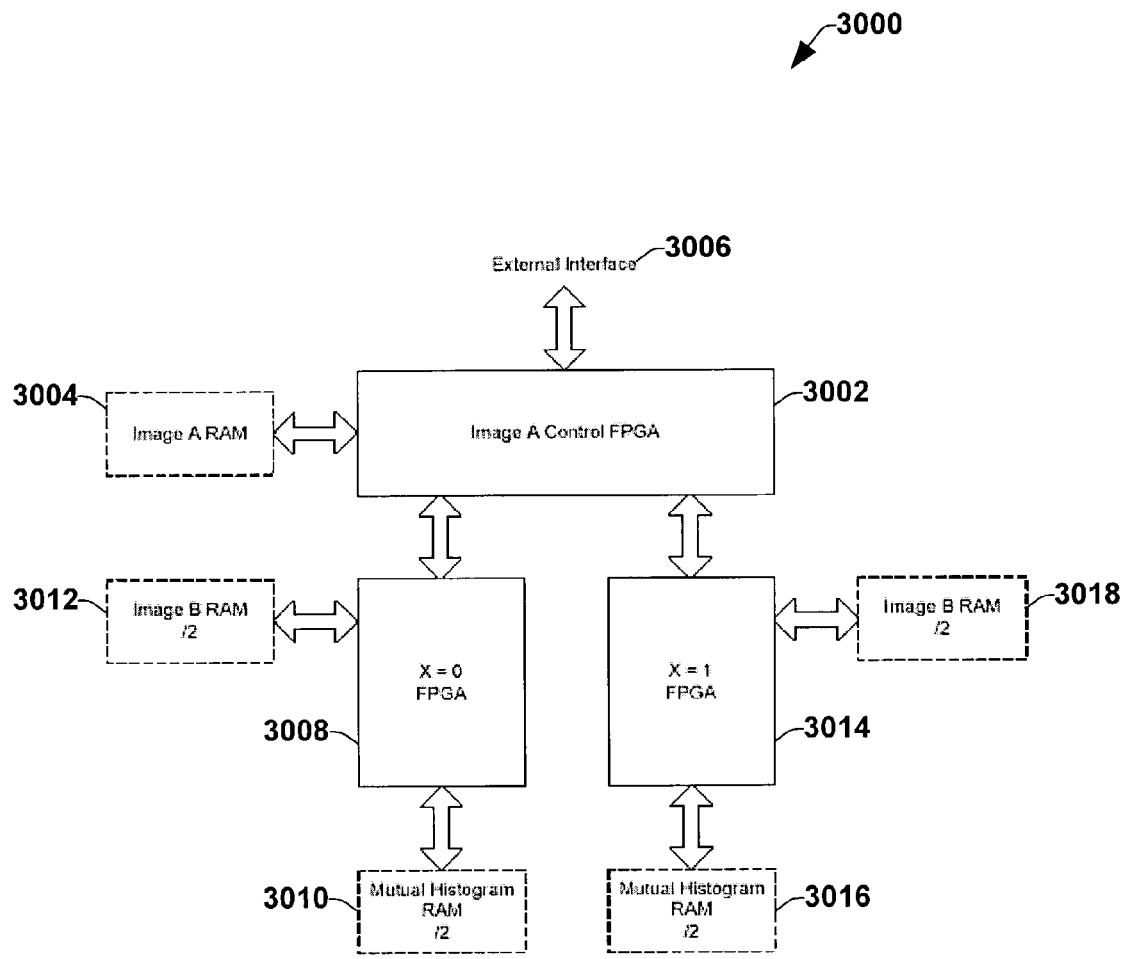
FIG. 30 is a block diagram illustrating a parallel FPGA architecture.

By way of still further example, parallel FPGAs can be utilized. In such an approach, the modules can be divided in half (e.g., by assigning the processing of Image B voxels with even x values to one FPGA and assigning the processing of Image B voxels with odd values to another FPGA. FIG. 30 is a block diagram 3000 illustrating such a parallel FPGA architecture. In the illustrated example, one FPGA 3002 interfaces with Image A RAM 3004 and the external interface 3006, another FPGA 3008 interfaces with MH RAM 3010 and Image B RAM 3012 for Image B voxels having even values and a final FPGA 3014 interfaces with MH RAM 3016 and Image B RAM 3018 for Image B voxels having odd values. Such an approach can be very efficient, require little communication between FPGAs and allow for a design with a high level of symmetry.

Figures 31, 32:
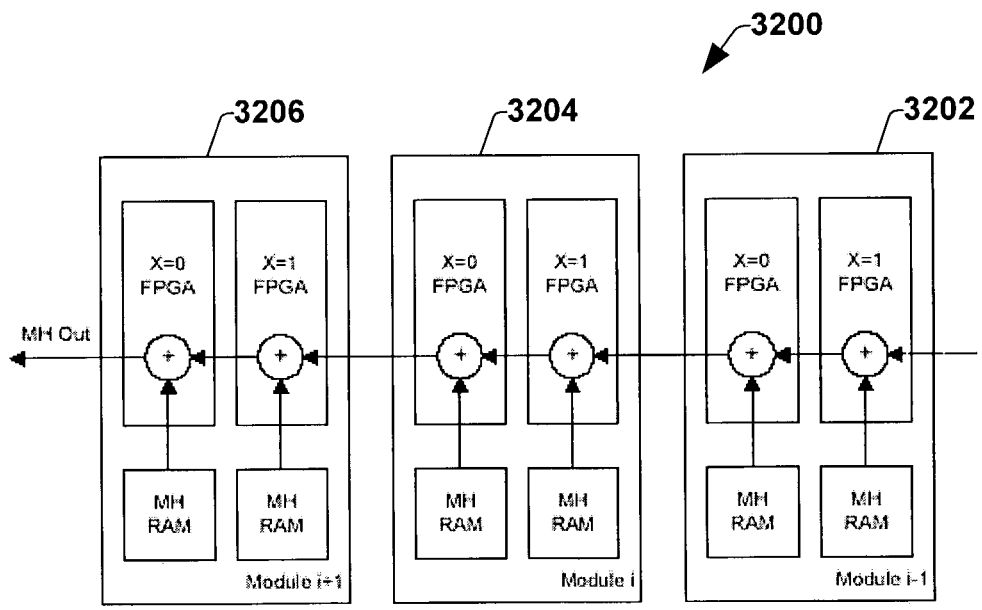
FIG. 31 illustrates exemplary device selection lists for respective blocks of an architecture according to an aspect of the present invention.
FIG. 32 is a block diagram illustrating an exemplary MH reading cascade chain.

Utilizing the parallel FPGAs partitioning scheme, the system can be implemented with 3 FPGAs 300, 5 SDRAMs and 2 SRAMs. A number (e.g., 4) of SDRAMs can be used for Image B because of burst accesses for cubic addressing described above. FIG. 31 illustrates a table 3100 depicting exemplary device selection lists for respective blocks.

By way of example, most of the system can run at 100 MHz, for example, while the IAC and the Image A SDRAM can work at a reduced clock frequency of 50 MHz to reduce power consumption and clock propagation issues in the PCB layout. A reduced clock speed can be achieved because burst accesses to the SDRAM facilitate a data transfer rate of about four times that of random accesses, which makes accesses to Image A RAM more efficient than accesses to Image B RAM.

The system can accommodate cascading boards and/or implementation of multiple parallel modules. FIG. 32 is a block diagram 3200 illustrating an exemplary MH reading cascade chain. Respective modules 3202, 3204, 3206 can have, for example, an 8-bit address, allowing for up to 256 parallel modules. It will be appreciated that while three modules are shown in FIG. 32, the present invention is not meant to be limited to such a number. Parallelization of the MH calculation algorithm can be performed by dividing Image A into several sub-images along the x-axis. Respective modules calculate the portion of the MH that corresponds to its Image A share. Once the modules are finished, reading the MH is performed by cascading the outputs of all the modules and adding them. A linear array topology can be chosen for simplicity and a reduced number of boards. If a heavily parallel arrangement (e.g., more than 10 modules) is implemented, then it may be recommended to use a binary tree topology to maximize the speed-up factor.

With regard to functional verification, the purpose of functional verification is to confirm that the logic inside the system works according to its specifications. Functional verification can be performed by performing white-box simulations on the different blocks. Some testbenches that can be run on the blocks include power-up, block operation, inter-block communication and external access. Power-up testbenches test the power-up behavior of individual blocks. Power-up may be particularly important to image controllers and the accumulator as the image controllers issue a sequence of power-up commands to the SDRAMs that can take approximately 20 µs to complete, and the accumulator clears the MH RAM at power up to facilitate that values inside the MH are zero. Block operation testbenches can be aimed at verifying the behavior of the blocks during MH calculation. This includes loading of image data from the SDRAMs, address generation, interpolation and accumulation on the MH RAM. Inter-block communication testbenches can be utilized to verify synchronization and data communication between blocks. External access testbenches verify external commands issuing from the PC, including parameter loading, image loading, process control and retrieval of results.

Figures 33, 34:
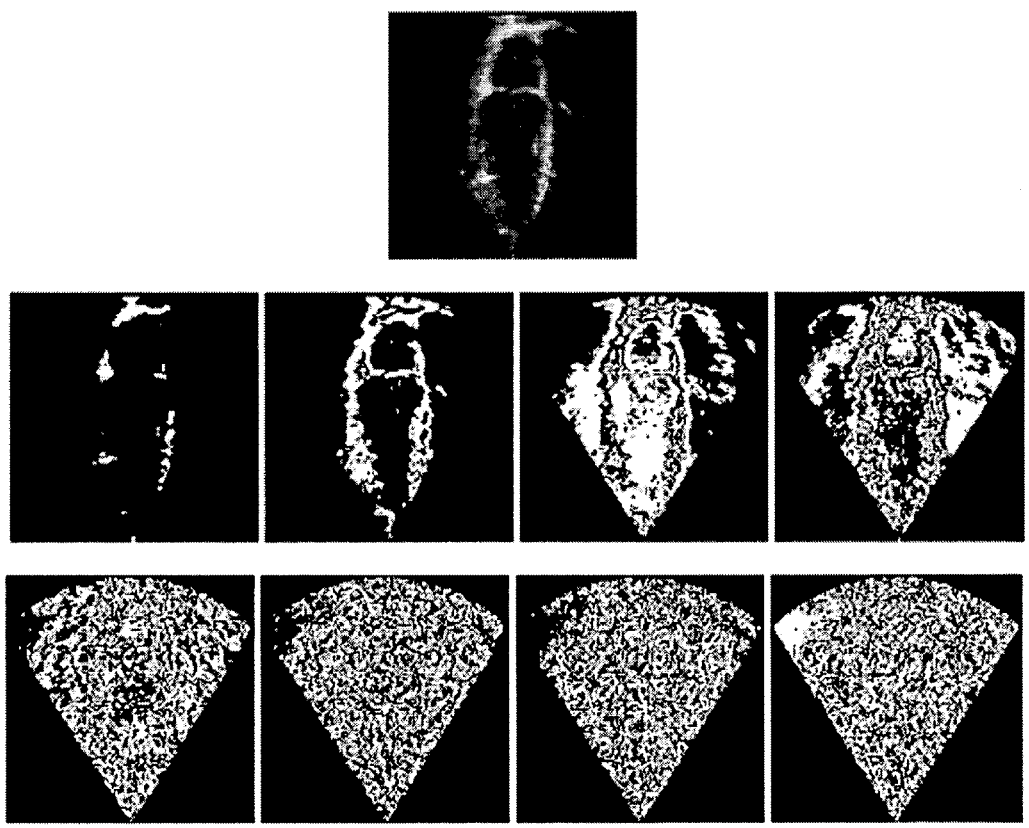
FIG. 33 is a table illustrating exemplary MI software calculation time vs. image size for a module obtained from VHDL simulations.
FIG. 34 illustrates a 3D heart ultrasound image with corresponding bit slices from MSB to LSB.

With regard to structural simulation and timing results, structural simulation of the system can be performed using VHDL models provided by IC manufacturers. Models with real-time delays can be utilized as a way to confirm that setup and hold times are proper across different chips. FIG. 33 is a table 3300 illustrating exemplary MI software calculation time vs. image size for a module obtained from VHDL simulations. It can be appreciated that the expected speed-up factor per module may be about 15 times the computation speed using software.

In addition to performing high-speed calculations of mutual information, the system can be utilized to suit particular image registration needs. By way of example, in the case of registration of images with more than 8 bits, image precision can be reduced to 8 bits to prevent obtaining a large MH with small values, which can mitigate attaining desired results when calculating the MI. Registration using MI is intuitively based on finding trends that relate the intensity distributions of two images. Depending on the image size and the level of noise in the images, the MH can sometimes have values that are too small to reveal any dependency between the intensity levels of the images being registered due to the fact that LSBs have a low correlation with the image shapes. FIG. 34 illustrates an example of a 3D heart ultrasound image 3400 with corresponding bit slices from MSB to LSB. It can be appreciated that the 3 LSB slices lack significant correlation with the shape in the image. To mitigate this situation, registration can be performed taking into account just some (e.g., 6 or 7) of the most significant bits of the image voxels. This results in a smaller MH (e.g., 64×64 or 128×128, as opposed to 256× 256) with bigger values and higher noise immunity. An MH calculation algorithm can be implemented that performs partial volume distribution interpolation, and which does not generate image values that are not present in the images (as opposed to trilinear interpolation). This characteristic can help when dealing with reduced precision images, because the MH values correspond to the reduced MH, without need to perform MH downsampling. In medical equipment that performs reduced image precision registration, a smaller MH and Image RAMs and a smaller, more efficient, interpolation pipeline can be utilized to effect a faster, lower-cost implementation.

By way of further example, color images can be registered with several approaches (e.g., grayscale conversion, single channel registration, joint channel registration). In a grayscale approach, for example, a color image is transformed into a grayscale intensity image, which is then registered using hardware. Single channel registration uses only one color channel (e.g., red, green or blue) for registration, treating it as a grayscale image. Joint channel registration registers each color channel separately with the goal of maximizing the sum of mutual information between channels. Joint channel registration requires the calculation of n·m mutual histograms, where n is the number of channels in the first image and m is the number of channels in the second image. Such an operation may benefit from parallel MH calculation as discussed above.

By way of still further example, elastic transformations of medical images can be used to study inter-individual variations and to track changes in anatomy over time. An elastic transformation is a special case of a non-rigid transformation that allows for local adaptivity and is kept continuous and smooth. The general form for an elastic transformation is shown below, where M is a 4×4 non-constant transformation matrix that converts points in image A to points in image B.

$$\begin{bmatrix} x_b \\ y_b \\ z_b \\ 1 \end{bmatrix} = M(x_a, y_a, z_a) \begin{bmatrix} x_a \\ y_a \\ z_a \\ 1 \end{bmatrix}$$

One example of elastic transformations used for image registration is the following:

$$x \leftarrow \sum_{i=1}^{n} a_{1,i} x^i + \sum_{i=1}^{n} b_{1,i} y^i + \sum_{i=1}^{n} c_{1,i} z^i + d_1$$

$$y \leftarrow \sum_{i=1}^{n} a_{2,i} x^i + \sum_{i=1}^{n} b_{2,i} y^i + \sum_{i=1}^{n} c_{2,i} z^i + d_2$$

$$z \leftarrow \sum_{i=1}^{n} a_{3,i} x^i + \sum_{i=1}^{n} b_{3,i} y^i + \sum_{i=1}^{n} c_{3,i} z^i + d_3$$

Figure 35:
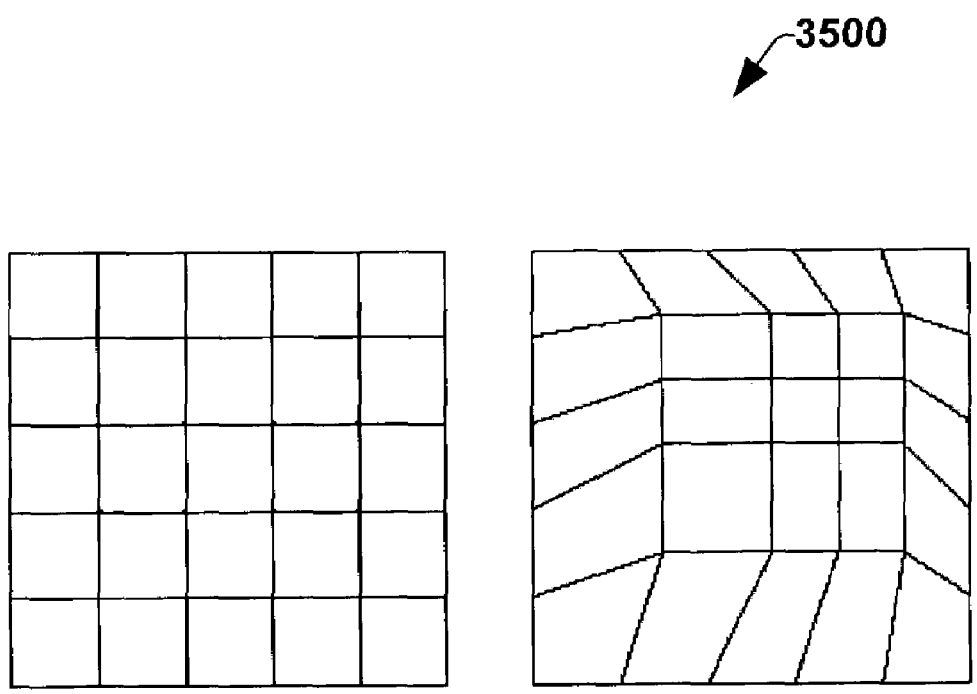
FIG. 35 illustrates an example of a 2D grid deformation utilizing a particular elastic transform.

A polynomial function can generally approximate most any kind of continuous function. In this case, the polynomials are utilized to model the deformation in space of the 3D voxel grid. An affine transform is a special case of this kind of elastic transformation, when n=1. Using higher orders for n facilitates modeling nonlinear distortions on images. FIG. 35 is a graphical depiction 3500 illustrating an example of a 2D grid deformation utilizing a particular elastic transform, namely:

$$x \leftarrow -0.04x^3 - 0.4x^2 + 2x, y \leftarrow -0.04y^3 - 0.4y^2 + 2y.$$

Region-wise elastic transformations can be implemented in accordance with one or more aspects of the present invention to achieve elastic image registration. With region-wise elastic transformations, a slowly-changing elastic transformation matrix can be represented by a set of constant affine transformation matrices, where respective matrices are applied to different sub regions of the image being transformed. Such a transformation can be implemented in steps, such as, performing full image registration using affine transformations, dividing the images into n sub-volumes, and performing elastic image registration by calculating for respective iterations the MH of respective sub-volumes in Image A' using a local affine transformation and adding the partial MHs to calculate MI. Such an algorithm yields an array of transformation matrices, where respective matrices correspond to sub-volumes of Image A.

According to one or more aspects of the present invention, an on-board DSP can be utilized to calculate the MI from the MH and perform optimization, thus making the system PC independent. The board can be attached to medical imaging systems to facilitate real-time image registration.

Dual-port SRAMs can be implemented for the MH RAM to increase MH RAM bandwidth (e.g., by a factor of two) by making MH read operations independent of MH write operations. By way of example only, some high-end (but potentially costly) FPGAs (e.g., from Altera) that have internal dual-port RAMs, as well as dual-port SRAMs from Cypress Corp, can be utilized as MH RAM.

To facilitate increased data throughput (e.g., over SDRAMs with burst transfers), double data rate (DDR) SDRAMs can be utilized that transfer data in both the rising edge and falling edge of the clock. While this effectively doubles the data rate in long burst transfers, random accesses may not be benefited, since commands are issued to the DDRAM at the clock rate.

To facilitate improved data bandwidth (e.g., over dynamic RAM), rambus direct RAM (RDRAM) memories can be utilized. RDRAM uses a narrow high-speed, constant-impedance bus (e.g., that runs at 400 MHz). RDRAMs can facilitate increased speed over SDRAMs and DDR SDRAMs when used for random accesses. However, special PCB engineering software may be required to implement, on a custom board, a low-swing signaling technology (e.g., Rambus Signaling Level (RSL)) utilized by the RDRAM bus.

It is to be appreciated that applications of the system described herein include, among other things, multi-modality registration of functional and anatomical images, such as CT and PET modalities, of many organs for accurate tumor outlining and localization (e.g., ultrasound+ultrasound heart, CT+PET brain, MR+SPECT brain, and ultrasound+SPECT heart, CT+MR+PET brain image fusion). Such information can be utilized, for example in making diagnosis and planning surgeries. Other applications include registration of serial MR images of the brain (and also other organs) to assess the progression of disease (such as multiple sclerosis) and the effect of therapies over time. Still other applications include real-time 3D stress echocardiography, which utilizes registration of pre- and post-stress 3D ultrasound images of the heart, registration of cardiac ultrasound and cardiac SPECT images that combines wall thickness and motion information from ultrasound with myocardial blood perfusion from SPECT, registration of PET brain images with MR and CT images for accurate radiation treatment and follow-up, and intra-operative image registration applications, such as with ultrasound images to warp (update) high-resolution pre-operative images. There are also intra-operative applications. For example, pre-operative 3D images may not accurately reflect anatomy exposed during surgery. Intra-operative images, such as those from ultrasound, can be used to warp (update) such high-resolution pre-operative images.

As used in this application, the term component is intended to refer to a computer-related entity (e.g. hardware, a combination of hardware and software, software, software in execution, a process running on a processor, a processor, an object, an executable, a thread of execution, a program, a computer, an application running on a server, a server). Additionally, as used in this application, system is a structure comprising one or more modules. A module is a structure comprising computer hardware and/or software (e.g. computer readable memory encoded with software instructions, computer configuration to carry out specified tasks, application program stored in computer readable memory, server on which an application runs, software object). Due to the nature of modules, multiple modules can be intermingled and are often not separated from one another. Systems can likewise be intermingled and inseparable.

It is to be appreciated that various aspects of the present invention may employ technologies associated with facilitating unconstrained optimization (e.g. back-propagation, Bayesian, Fuzzy Set, Non Linear regression, or other neural network paradigms including mixture of experts, cerebellar model arithmetic computer (CMACS), Radial Basis Functions, directed search networks, and functional link nets).

What has been described above includes exemplary implementations of aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A hardware pipeline for 3D image registration, comprising:

a first memory module for storing volumetric data comprising a first three dimensional image;

a second memory module for storing volumetric data comprising a second three dimensional image;

a third memory module for storing MH data;

an address generator/first image controller;

an interpolator;

a second image controller; and an accumulator/MH controller, wherein each of the first, second and third memory modules are configured for computational access independently of the other two memory modules, wherein the address generator/first image controller is operable to access the first memory module for first image data and mask data, and to send first image address and control data to the first memory module, and to send interpolation data and second image address data to the interpolator and second image controller, respectively, and to send first image data to the accumulator/MH controller, wherein the second image controller is operable to receive second image data and mask data from the second memory module, and to send second image address and control data to the second memory module, and to send second image data to the accumulator/MH controller, wherein the accumulator/MH controller is operable to send MH address and control data to the MH RAM, and to send MH data to and receives MH data from the third memory module, wherein the interpolator is operable to send interpolation weights to the accumulator/MH controller.

2. The pipeline of claim 1, wherein at least one of: the first and second memory modules respectively comprise one or more components of SDRAM and the third memory module comprises one or more components of synchronous fast SRAM.

3. The pipeline of claim 1, further comprising:

an address decoder; and a compactor, wherein the address decoder is operable to receive second image address data from the address generator, and to send cubic addresses to the second image controller, the address decoder being operable to convert the second image address data to cubic addresses which can be utilized for selective access of the second image memory module, wherein the compactor is operable to receive interpolation weights and second image data from the interpolator and second image controller, respectively, and to send compacted second image data and weights to the accumulator/MH controller.

4. The pipeline of claim 3, wherein the interpolator comprises:
- a first stage operable to calculate compliments of one or more coordinates;
- a second stage operable to calculate one or more products of the one or more coordinates;
- a third stage operable to perform a multiplication on one or more of the products resulting from the second stage; and
- a fourth stage operable to shuffle results of the third stage to relate the results to corresponding second image values.

5. The pipeline of claim 1, where at least one of the first memory module and the second memory module are configured to organize the volumetric data according to a cubic addressing scheme.

6. The pipeline of claim 2, where at least one of the first memory module and the second memory module are configured to organize the volumetric data according to a cubic addressing scheme.

7. The pipeline of claim 3, where at least one of the first memory module and the second memory module are configured to organize the volumetric data according to a cubic addressing scheme.

8. The pipeline of claim 4, where at least one of the first memory module and the second memory module are configured to organize the volumetric data according to a cubic addressing scheme.

9. The pipeline of claim 1, wherein at least one of the address generator/first image controller, interpolator, second image controller and accumulator/MH controller comprise a field programmable gate array (FPGA).

10. The pipeline of claim 1, wherein the accumulator/MH controller clears the MH RAM at the beginning MH calculations.

11. The pipeline of claim 1, wherein the accumulator/MH controller performs interpolation such that the values added to the MH are calculated from a fractional position of the first image in the second image.

12. The pipeline of claim 11, wherein a 2×2×2 neighborhood of the second image can be accessed to perform interpolation.

13. The pipeline of claim 1, wherein the first image can be stored in a single 16M×16 sequential access RAM module while the second image can be stored using a cubic addressing scheme with eight RAM modules.

14. The pipeline of claim 1, wherein the first image can be divided into a plurality of sub-volumes and distributed for calculations.

15. A method of performing 3D image registration by computing an MH matrix based on a first 3D image and a second 3D image, wherein each image is comprised of volumetric data, the method comprising:
for respective voxels in the first image:
- reading voxels from the first image;
- computing a transformed coordinate for the voxels by computing a vector $v_{Org}$ by applying the following vector transformation:

$$v_{Org} = T \cdot \tfrac{1}{2}(\max\_x \cdot (\Delta v/\Delta x) + \max\_y \cdot (\Delta v/\Delta x) + \max\_z \cdot (\Delta v/\Delta x));$$

verifying the validity of the transformed coordinates for the voxels; and upon verifying the validity of the transformed coordinates, adding the interpolated values of the voxels to the MH matrix by applying the following interpolation:

$$v_z = v_{Org}$$

for $z = 0$ to $\max\_z - 1$ $$v_y = v_z$$
$$v_z = v_z + \Delta v / \Delta z$$

for $y = 0$ to $\max\_y - 1$ $$v_x = v_x + (\Delta v / \Delta x)$$
$$v_B = \mathrm{Int}(v_x)$$
$$v_{frac} = v_x - v_B$$

$$W = \begin{bmatrix} v_{frac}(x) \cdot v_{frac}(y) \cdot v_{frac}(y) \\ v_{frac}(x) \cdot v_{frac}(y) \cdot (1 - v_{frac}(z)) \\ v_{frac}(x) \cdot (1 - v_{frac}(y)) \cdot v_{frac}(z) \\ v_{frac}(x) \cdot (1 - v_{frac}(y)) \cdot (1 - v_{frac}(z)) \\ (1 - v_{frac}(x)) \cdot v_{frac}(y) \cdot v_{frac}(z) \\ (1 - v_{frac}(x)) \cdot v_{frac}(y) \cdot (1 - v_{frac}(z)) \\ (1 - v_{frac}(x)) \cdot (1 - v_{frac}(y)) \cdot v_{frac}(z) \\ (1 - v_{frac}(x)) \cdot (1 - v_{frac}(y)) \cdot (1 - v_{frac}(z)) \end{bmatrix}$$

for $i = 0$ to 1
for $j = 0$ to 1
for $k = 0$ to 1

$$v_{BAdd} = v_B + \begin{bmatrix} i \\ j \\ k \end{bmatrix}$$

$$\mathrm{Int\_Index} = 7 - 4i - 2j - k$$

$$MH(A(x, y, z), B(v_{BAdd})) \mathrel{+}= W(\mathrm{Int\_Index})$$

wherein the mathematical symbols used in the MH data calculation represent the following:
- x, y, and z represent x, y, and z coordinates, respectively, of the voxels;
- max_x, max_y, and max_z represent maximum x, y, and z dimensions, respectively, of the first image;
- $v_x$, $v_y$, and $v_z$ represent x, y, and z vectors, respectively, of the vector for computing the transformed coordinates of the voxels;
- $v_B$ represents the origin of the voxels of the second image that comprise the neighborhood of the voxels;
- $v_{frac}$ represents the fractional parts of $v_x$ used to calculate interpolation weights;
- W represents the vector that contains eight interpolation weights;
- i, j, and k represent x, y, and z coordinates, respectively, of the voxels of the second image that comprise the neighborhood of the voxels;
- Int_Index represents the W vector index used to transform respective weights of the voxels of the second image that comprise the neighborhood of the voxels; and
- MH represents the Mutual Histogram matrix.

* * * * *

UNITED STATES PATENT AND TRADEMARK OFFICE
CERTIFICATE OF CORRECTION

| | | |
|---|---|---|
| PATENT NO. | : 7,280,710 B1 | Page 1 of 1 |
| APPLICATION NO. | : 10/443249 | |
| DATED | : October 9, 2007 | |
| INVENTOR(S) | : Carlos R. Castro-Pareja et al. | |

It is certified that error appears in the above-identified patent and that said Letters Patent is hereby corrected as shown below:

Claim 15, Column 30, line 19: Please replace the equation "Vfrac(x) • Vfrac(y) • Vfrac(y)" with --Vfrac(x) • Vfrac(y) • Vfrac (z)--

Signed and Sealed this

Eleventh Day of December, 2007

JON W. DUDAS
*Director of the United States Patent and Trademark Office*